United States Patent
Roberts et al.

(10) Patent No.: US 7,329,965 B2
(45) Date of Patent: Feb. 12, 2008

(54) AERODYNAMIC-HYBRID VERTICAL-AXIS WIND TURBINE

(75) Inventors: Gary D. Roberts, Montpelier, ID (US); David W. Roberts, Montpelier, ID (US)

(73) Assignee: Novastron Corporation, Montpelier, ID (US)

( * ) Notice: Subject to any disclaimer, the term of this patent is extended or adjusted under 35 U.S.C. 154(b) by 183 days.

(21) Appl. No.: 11/145,523

(22) Filed: Jun. 3, 2005

(65) Prior Publication Data

US 2006/0275105 A1    Dec. 7, 2006

(51) Int. Cl.
F03D 9/00    (2006.01)
H02P 9/04    (2006.01)

(52) U.S. Cl. .......................................... 290/55; 290/44
(58) Field of Classification Search ................. 290/55, 290/54, 44, 43; 415/907, 4.2, 2.1; 416/7, 416/119, 132 B
See application file for complete search history.

(56) References Cited

U.S. PATENT DOCUMENTS

| 250,806 | A | | 12/1881 | Hamel | |
|---|---|---|---|---|---|
| 3,050,007 | A | * | 8/1962 | Rydz | 415/69 |
| 4,236,866 | A | * | 12/1980 | Zapata Martinez | 415/4.4 |
| 5,075,564 | A | | 12/1991 | Hickey | |
| 5,254,876 | A | | 10/1993 | Hickey | |
| 5,380,149 | A | * | 1/1995 | Valsamidis | 415/2.1 |
| 5,391,926 | A | * | 2/1995 | Staley et al. | 290/55 |
| 5,463,257 | A | * | 10/1995 | Yea | 290/55 |
| 5,664,418 | A | * | 9/1997 | Walters | 60/398 |
| 6,020,725 | A | | 2/2000 | Roberts | |
| 6,172,429 | B1 | * | 1/2001 | Russell | 290/54 |
| 6,280,144 | B1 | * | 8/2001 | Powers | 416/236 A |
| 6,309,172 | B1 | | 10/2001 | Gual | |
| 6,465,899 | B2 | * | 10/2002 | Roberts | 290/44 |
| 6,518,680 | B2 | * | 2/2003 | McDavid, Jr. | 290/54 |
| 6,538,340 | B2 | | 3/2003 | Elder | |
| 6,666,650 | B1 | | 12/2003 | Themel | |
| 6,740,989 | B2 | | 5/2004 | Rowe | |
| 6,800,955 | B2 | | 10/2004 | McDavid, Jr. | |
| 6,809,431 | B1 | | 10/2004 | Schippmann | |
| 6,841,894 | B2 | | 1/2005 | Gomez Gomar | |
| 6,850,821 | B2 | | 2/2005 | Weitkamp | |
| 6,853,096 | B1 | | 2/2005 | Yu et al. | |
| 6,870,280 | B2 | * | 3/2005 | Pechler | 290/55 |
| 6,916,150 | B2 | * | 7/2005 | Liang | 415/115 |
| 2004/0164561 | A1 | * | 8/2004 | Nagawa et al. | 290/55 |
| 2005/0006904 | A1 | | 1/2005 | Bayer | |
| 2006/0056967 | A1 | * | 3/2006 | Liang | 416/97 R |

\* cited by examiner

*Primary Examiner*—Julio C. Gonzalez
(74) *Attorney, Agent, or Firm*—Thorpe North & Western, LLP

(57) ABSTRACT

An aerodynamic-hybrid, vertical-axis wind turbine which includes a rotor airfoil and stator blade combination which maximizes energy production by increasing wind velocity and pressure while eliminating back pressure and improving the laminar flow of wind both around and through the device. The rotor airfoils have a horizontal cross-section with a crescent shape including a convex leading side and a concave trailing side with a thicker middle section that tapers to narrower sections at ends. The stator blades have a horizontal cross-section with a planar side and a convex side. Rotor airfoil and stator blade combinations are secured between upper and lower annular sails.

38 Claims, 17 Drawing Sheets

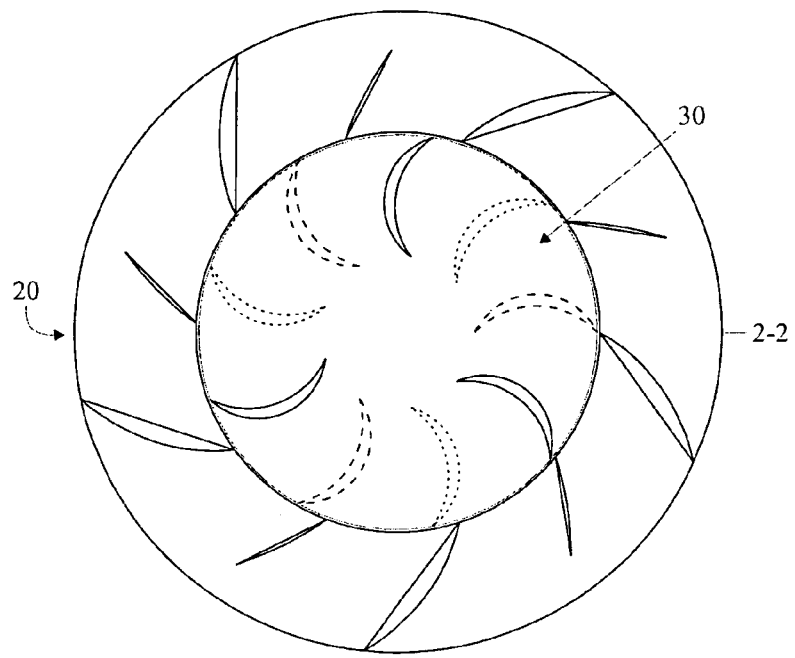
Fig. 7a
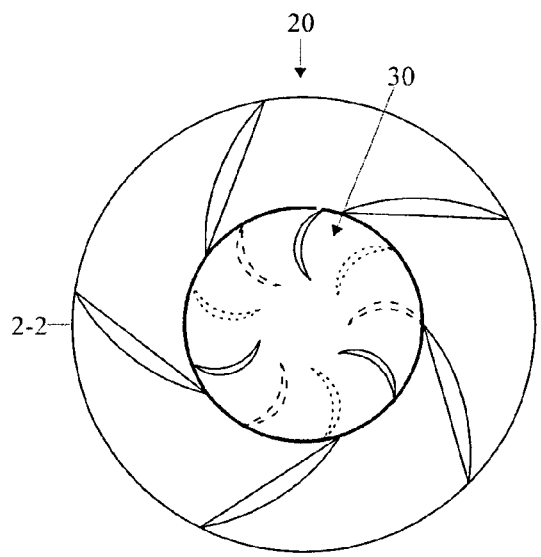 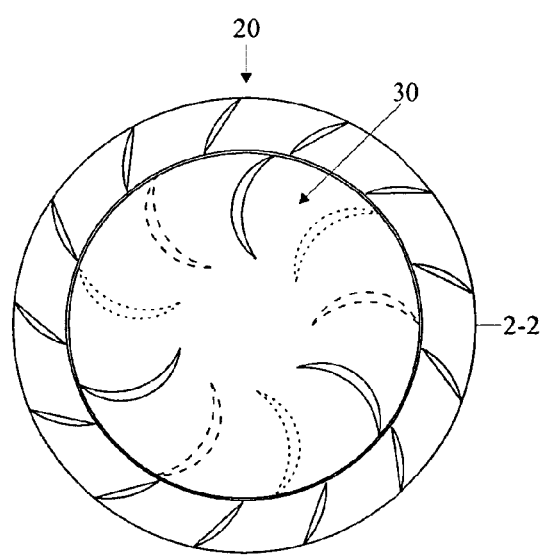
Fig. 7b  Fig. 7c

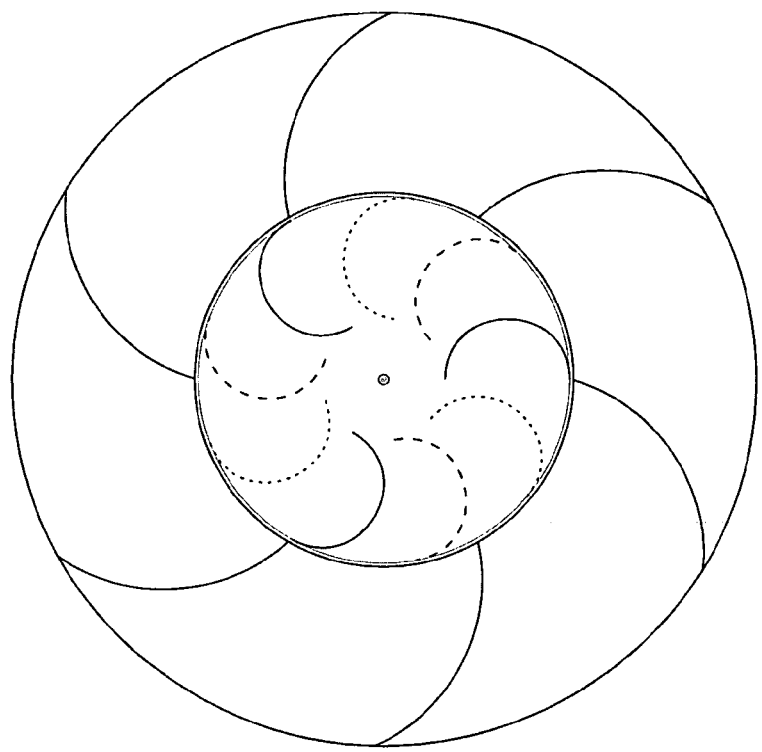
Fig. 17a
Prior Art
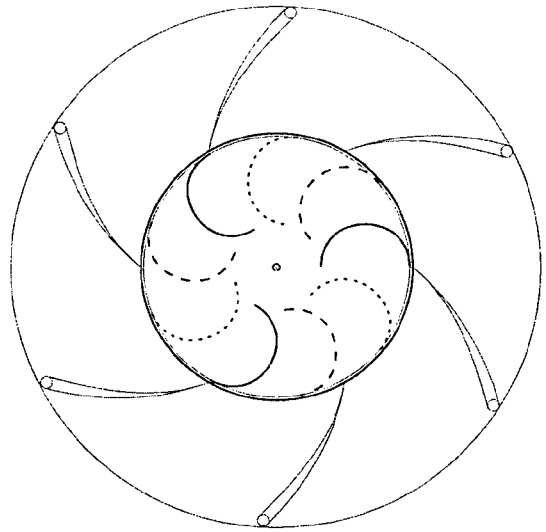 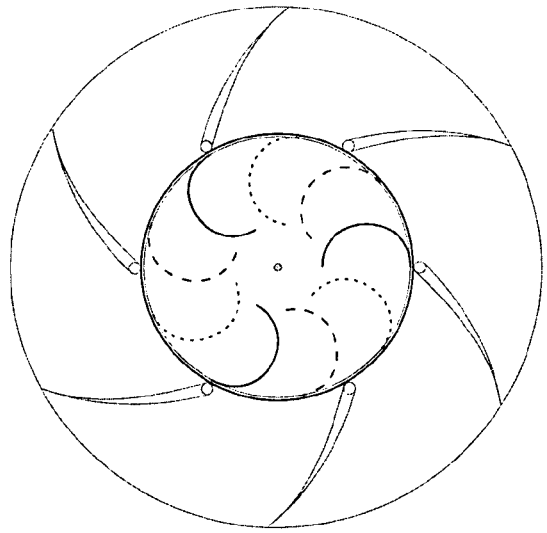
Fig. 17b
Prior Art
Fig. 17c
Prior Art

AERODYNAMIC-HYBRID VERTICAL-AXIS WIND TURBINE

BACKGROUND OF THE INVENTION

1. Field of the Invention

The present invention relates generally to generation of electricity by wind driven generators. More particularly, the present invention is a vertical axis wind turbine configured to efficiently harvest energy from the wind.

2. Related Art

Given the current global energy crisis, increased political tension with the world's largest petroleum suppliers, and the deleterious effects that fossil fuels have on the environment, renewable energy resources, including wind, are rapidly becoming less "alternative" and more an indispensable fact of life. Properly designed, a vertical-axis wind turbine features several distinct advantages over their horizontal-axis counterparts including increased safety, reduced environmental issues, and ameliorated location insensitivity to name only a few of the more conspicuous advantages.

Unfortunately, prior art vertical-axis wind turbines have suffered from fundamental design flaws, crippling their enormous latent potential. The overwhelming majority of such turbines attempt to compete with the horizontal-axis turbine's highly efficient aerodynamic lift properties by compressing oncoming wind in order to compensate with brute drag force. Others simply provide various means for reducing back pressure; a few even attempt both techniques.

U.S. Pat. No. 6,870,280 to Pechler and U.S. Pat. No. 6,309,172 to Gual disclose vertical-axis wind turbine devices that utilize both aerodynamic lift and drag forces as the principal means of inducing torque upon the rotor. However, neither of these devices employ rotor airfoils that exhibit bidirectional characteristics. Additionally, the Gual patent further teaches the exclusive use of unidirectional blades as stator blades. The primary consequence of a unidirectional blade, employed within a vertical-axis wind turbine device, is increased turbulence and muted efficiency. Moreover, due to the hook shape of Pechler's rotor blades, and the prominent bulges associated with the Gual blades, as wind exits past these blades turbulence will ensue, and laminar flow potential will be greatly diminished. Moreover, the Gual patent has stator blades that are asymmetrical, and therefore, not uniformly convex. Furthermore, the Pechler patent acknowledges that these hook shaped rotor blades are capable of imparting aerodynamic lift only when stationed at the wind receiving side of the device, and only sail propulsion elsewhere. The Pechler patent further discloses a rotor that is overwhelmingly small in relative proportion to the stator. This design attribute will inevitably produce a bow shock on the proximal side of the wind stream, substantially throttling aerodynamic efficiencies, while concurrently producing increased turbulence distally.

In U.S. Pat. No. 5,380,149 to Valsamidis, there is disclosed a vertical-axis wind turbine device. However, as concluded by the inventor, this apparatus was designed to operate as a vortex effect machine. In other words, it utilizes aerodynamic drag, or sail propulsion, as the principal means of inducing torque upon the rotor. Both the guide veins and rotor blades of this design are collectively oriented and formed such that their respective angles and various shapes combine to constrain oncoming wind to strike the concave-trailing side of the rotor blades without regard for the laminar flow of wind over their convex-leading sides. Moreover, the convex sides of the guide veins are invariably oriented opposite to the convex sides of adjacent rotor blades, and are therefore particularized exclusively for sail propulsion. Valsamidis does not teach a means for inducing a laminar flow of wind over both the convex-leading and concave-trailing sides the rotor blades in order to induce aerodynamic lift. Furthermore, Valsamidis teaches fluid flow ducts to be incorporated within all of the various blade structures. These ducts serve to equalize the air pressure on both the leading and trailing sides of the blades; thereby, aerodynamic lift potential is abandoned in favor of less efficient thrust mechanisms—aerodynamic lift is a coextensive byproduct of dissimilar air pressures that are induced upon opposite sides of an airfoil. Furthermore, placing more than three rotor airfoils on a single tier effectually closes off the center of the rotor, and a proportionate reduction in aerodynamic lift potential ultimately results.

Only one prior art device, known to the present inventors, has successfully employed both aerodynamic lift and drag forces, in concert with back pressure relief, in a consolidated vertical-axis wind turbine apparatus utilizing a multi-tiered rotor and bidirectionally primitive stator and rotor blades. U.S. Pat. No. 6,465,899 to Roberts describes an omni-directional vertical-axis wind turbine, having an increased capacity to convert wind energy to electrical energy when compared to any relative prior art apparatus, over an expanded range of wind speeds. Moreover, the aforementioned innovation does, in fact, successfully eliminate many of the drawbacks historically associated with prior art vertical-axis wind turbine designs, while concurrently facilitating a greater appreciation of the many inherent disadvantages accompanying the pervasive horizontal-axis varieties, as propounded by the aforesaid patent. However, although field testing—conducted by the principal inventor of both the referent and present invention—substantiated the referent claims, several disadvantages were discovered.

Even though the stator blades do reduce back pressure, while providing a novel means for effectively transferring torque to the rotor cups, during both their advance and return phase of rotation, they are not adequate to optimally provide this essential function omni-directionally. This is primarily a consequence of their primitive shape. These blades do not qualify as effective bidirectional airfoils, and therefore, are not conducive to the laminar conduction of wind through or around the device. Moreover, whenever the oncoming wind is oriented nearly perpendicular to the chord of the arc of the far-right stator blade—refer to FIG. 17a of the drawings—the fully cupped shape of the blade produces a significant amount of turbulence instead of channeling the wind as intended. Consequently, overall operating efficiency drops significantly, and the wind directional aggregate of the device is reduced to roughly 270 degrees out of the possible 360 degrees postulated by the patent.

The invariant hemicyclic arcs of the rotor cups do minimize drag on their convex side; however, this shape is not a paragon for either harnessing or discharging the wind as it flows through the device. Again, this is a consequence of their primitive shape. These blades are not highly efficient bidirectional airfoils, and therefore are not conducive to the laminar flow of wind through the device. Moreover, as wind moves past these rotor cups at shallow angles, the induced torque potential falls far below maximum. Peak moments of torque only occur as the oncoming wind is nearly perpendicular to the concave region of a rotor cup, and falls rapidly as the attack angles become more acute. Furthermore, because the harnessed wind cannot be released as early as would be ideal, downstream laminar flow potential is diminished.

The stator/rotor combination of this device is a very effective construct for increasing both wind speed and pressure, by means of the conservation of angular momentum, as described by the referent patent. However, their roughly equivalent structural proportion ratios attempt to compress oncoming wind well beyond the known theoretical limits of Betz Law, resulting in a bow shock on the proximal side of the device, and increased turbulence distally. This unfavorable effect occurs, to some degree, even while operating under low wind speed conditions.

Limiting the energy conversion options of the referent invention, exclusively to the transitionally-coupled generators described in U.S. Pat. No. 6,020,725 to Roberts, restricts virtually all design implementations to grid interconnections. Furthermore, requiring a plurality of these generators may be proscribed in specialized or small-scale energy output models. The foregoing critique notwithstanding, there are profound benefits to this design concept, and should not be considered fully without merit in all cases.

Additional prior art designs, developed by the present inventors, employed traditional, Darrieus-like, airfoils as stator and/or rotor blades. However, testing conclusively revealed the primary disadvantages of this paradigm to be turbulence, noise, and muted efficiency resulting from the non-bidirectional characteristics of the blades. Consequently, wind became turbulent either upon entering or exiting these developmental predecessors.

SUMMARY OF THE INVENTION

With the foregoing background of the present invention in mind, and as descriptions of the various embodiments and distinguishing characteristics proceed, it will be appreciated that it is desirable to provide a dynamic, stackable, vertical-axis, aerodynamic-hybrid wind turbine having an optimized omni-directional bias, which is free of the aforementioned and other such disadvantages, so as to provide wind energy extraction capabilities that border the currently understood theoretical limits, over an extended range of wind velocities and/or altitudes.

Accordingly, and in general terms, the present invention provides a vertical wind turbine device with a rotor, rotatable about a vertical axis in an annular stator, and a plurality of vertically elongated rotor airfoils is disposed circumferentially around the vertical axis. The rotor airfoils each have a horizontal cross-section with a crescent shape including a convex leading side and a concave trailing side. A thicker middle section tapers to narrower sections at ends. A plurality of vertically elongated stator blades is disposed circumferentially around the vertical axis. The stator blades each have a horizontal cross-section with a planar side and a convex side. The convex side of the stator blades and the convex leading side of the rotor airfoils being oriented to face circumferentially around the vertical axis in a common direction In accordance with another more detailed aspect of the present invention, the crescent shape of the rotor airfoils are symmetrical about a vertical bisection, the vertical bisection being oriented orthogonal to a longitudinal direction of the horizontal cross-section.

In accordance with another more detailed aspect of the present invention, an open center is defined between the rotor airfoils which are spaced apart radially from the vertical axis without any structure between the rotor airfoils and the vertical axis. A diameter of the open center is approximately 38% of a diameter of the rotor.

In accordance with another more detailed aspect of the present invention, the convex side of the stator blades are symmetrical about a vertical bisection, the vertical bisection being oriented orthogonal to a longitudinal direction of a horizontal cross-section of the stator blade.

In accordance with another more detailed aspect of the present invention, the rotor airfoils are larger in proportion to the stator blades.

In accordance with another more detailed aspect of the present invention, the stator blades are primary stator blades having common dimensions. A plurality of vertically elongated secondary stator blades is disposed circumferentially around the vertical axis. The secondary stator blades have smaller dimensions than the primary stator blades.

In accordance with another more detailed aspect of the present invention, the stator blades include a plurality of elongated, horizontally oriented grooves formed in the convex side.

In accordance with another more detailed aspect of the present invention, the stator blades are hollow and include means for deicing the stator blades or means for conveying energy through the stator blades.

In accordance with another more detailed aspect of the present invention, the planar side of the stator blades are oriented at an angle with respect to a plane passing through the vertical axis and a tip of the stator blade between 103 to 149 degrees.

In accordance with another more detailed aspect of the present invention, the rotor airfoils are oriented at an angle with respect to the vertical axis between 0 to 23 degrees in either direction.

In accordance with another more detailed aspect of the present invention, the rotor airfoils are primary rotor airfoils having common dimensions. A plurality of vertically elongated secondary rotor airfoils is disposed circumferentially around the vertical axis. Each secondary rotor airfoils is disposed adjacent to and spaced-apart from the leading side of a corresponding primary rotor airfoils. The secondary rotor airfoils have smaller dimensions than the primary rotor airfoils.

In accordance with another more detailed aspect of the present invention, the rotor airfoils include a plurality of elongated, horizontally oriented grooves formed in the convex leading side.

In accordance with another more detailed aspect of the present invention, the rotor is divided into at least two rotor subsections coupled to at least one energy conversion nexus disposed at an elevated location between the at least two rotor subsections.

In accordance with another more detailed aspect of the present invention, the rotor includes a plurality of rotor modules stacked and coupled together to form a desired height.

In accordance with another more detailed aspect of the present invention, the rotor airfoils include a plurality of sequential, horizontal tiers. The rotor airfoils of each tier have a different angular orientation with respect to an adjacent tier.

In addition, the present invention provides a vertical wind turbine device with a rotor rotatable about a vertical axis, and a plurality of vertically elongated rotor airfoils is disposed circumferentially around the vertical axis. An open center is defined between the rotor airfoils which are spaced apart radially from the vertical axis without any structure between the rotor airfoils and the vertical axis. A diameter of the open center is approximately 38% of a diameter of the rotor.

In accordance with another more detailed aspect of the present invention, the rotor airfoils each have a horizontal cross-section with a crescent shape including a convex leading side and a concave trailing side with a thicker middle section that tapers to narrower sections at ends.

In accordance with another more detailed aspect of the present invention, the crescent shape of the rotor airfoils are symmetrical about a vertical bisection, the vertical bisection being oriented orthogonal to a longitudinal direction of the horizontal cross-section.

In accordance with another more detailed aspect of the present invention, an annular stator is disposed around the rotor, and a plurality of vertically elongated stator blades is disposed circumferentially around the vertical axis. The stator blades each have a horizontal cross-section with a planar side and a convex side.

In accordance with another more detailed aspect of the present invention, the convex side of the stator blades is symmetrical about a vertical bisection, the vertical bisection being oriented orthogonal to a longitudinal direction of a horizontal cross-section of the stator blade.

In addition, the present invention provides a vertical wind turbine device with a rotor rotatable about a vertical axis in an annular stator. A plurality of vertically elongated rotor airfoils is disposed circumferentially around the vertical axis. A plurality of vertically elongated stator blades is disposed circumferentially around the vertical axis. The stator blades each have a horizontal cross-section with a planar side and a convex side.

In accordance with another more detailed aspect of the present invention, the convex side of the stator blades is symmetrical about a vertical bisection, the vertical bisection being oriented orthogonal to a longitudinal direction of a horizontal cross-section of the stator blade.

In accordance with another more detailed aspect of the present invention, the rotor airfoils each have a horizontal cross-section with a crescent shape including a convex leading side and a concave trailing side with a thicker middle section that tapers to narrower sections at ends.

In accordance with another more detailed aspect of the present invention, the crescent shape of the rotor airfoils is symmetrical about a vertical bisection, the vertical bisection being oriented orthogonal to a longitudinal direction of the horizontal cross-section.

In accordance with another more detailed aspect of the present invention, an open center is defined between the rotor airfoils which are spaced apart radially from the vertical axis without any structure between the rotor airfoils and the vertical axis. A diameter of the open center is approximately 38% of a diameter of the rotor.

In accordance with another more detailed aspect of the present invention, the stator blades are primary stator blades having common dimensions. A plurality of vertically elongated secondary stator blades is disposed circumferentially around the vertical axis. The secondary stator blades have smaller dimensions than the primary stator blades.

In accordance with another more detailed aspect of the present invention, the stator blades include a plurality of elongated, horizontally oriented grooves formed in the convex side.

In accordance with another more detailed aspect of the present invention, the stator blades are hollow and include means for deicing the stator blades.

In accordance with another more detailed aspect of the present invention, the planar side of the stator blades is oriented at an angle with respect to a plane passing through the vertical axis and a tip of the stator blade between 103 to 149 degrees.

In accordance with another more detailed aspect of the present invention, the rotor airfoils are primary rotor airfoils having common dimensions. A plurality of vertically elongated secondary rotor airfoils is disposed circumferentially around the vertical axis. Each secondary rotor airfoils is disposed adjacent to and spaced-apart from the leading side of a corresponding primary rotor airfoils. The secondary rotor airfoils have smaller dimensions than the primary rotor airfoils.

In accordance with another more detailed aspect of the present invention, the rotor airfoils include a plurality of elongated, horizontally oriented grooves formed in the convex leading side.

In accordance with another more detailed aspect of the present invention, the rotor is divided into at least two rotor subsections coupled to at least one energy conversion nexus disposed at an elevated location between the at least two rotor subsections.

In accordance with another more detailed aspect of the present invention, the rotor includes a plurality of rotor modules stacked and coupled together to form a desired height.

In accordance with another more detailed aspect of the present invention, the rotor airfoils include a plurality of sequential, horizontal tiers. The rotor airfoils of each tier have a different angular orientation with respect to an adjacent tier.

In addition, the present invention presents a vertical wind turbine device with a rotor rotatable about a vertical axis, and a plurality of vertically elongated rotor airfoils is disposed circumferentially around the vertical axis. The rotor is divided into at least two rotor subsections coupled to at least one energy conversion nexus disposed at an elevated location between the at least two rotor subsections.

In accordance with another more detailed aspect of the present invention, at least two rotor subsections include a plurality of rotor subsections stacked and coupled together to form a desired height.

In accordance with another more detailed aspect of the present invention, the rotor airfoils each have a horizontal cross-section with a crescent shape including a convex leading side and a concave trailing side with a thicker middle section that tapers to narrower sections at ends.

In accordance with another more detailed aspect of the present invention, the crescent shape of the rotor airfoils are symmetrical about a vertical bisection, the vertical bisection being oriented orthogonal to a longitudinal direction of the horizontal cross-section.

In accordance with another more detailed aspect of the present invention, an open center is defined between the rotor airfoils which are spaced apart radially from the vertical axis without any structure between the rotor airfoils and the vertical axis. A diameter of the open center is approximately 38% of a diameter of the rotor.

In accordance with another more detailed aspect of the present invention, an annular stator is disposed around the rotor, and a plurality of vertically elongated stator blades is disposed circumferentially around the vertical axis. The stator blades each have a horizontal cross-section with a planar side and a convex side.

In accordance with another more detailed aspect of the present invention, the convex side of the stator blades is symmetrical about a vertical bisection, the vertical bisection being oriented orthogonal to a longitudinal direction of a horizontal cross-section of the stator blade.

In addition, the present invention presents a vertical wind turbine device with a naked rotor rotatable about a vertical axis without an annular stator surrounding the rotor. A plurality of vertically elongated rotor airfoils are disposed circumferentially around the vertical axis. The rotor airfoils each have a horizontal cross-section with a crescent shape including a convex leading side and a concave trailing side with a thicker middle section that tapers to narrower sections at ends.

In accordance with another more detailed aspect of the present invention, the rotor airfoils include a plurality of sequential, horizontal tiers. The rotor airfoils of each tier have a different angular orientation with respect to an adjacent tier.

The present invention provides a novel, scientifically founded, means of inducing maximal energy transition torque on a stackable, vertical-axis, aerodynamic-hybrid wind turbine apparatus, over the entire 360 degrees of rotation, by eliminating salient back pressure while effectively and efficiently harnessing both aerodynamic lift and drag forces, in an embodiment employing consummate, stator and rotor, bidirectional airfoils, without regard for horizontal wind orientation. Furthermore, the unique design innovations of the present invention resolve the inherent underlying disadvantages encountered with prior art designs, resulting in an environmentally friendly device exhibiting energy extraction capabilities that border the currently understood theoretical limits, over an extended range of wind velocities and/or altitudes, and unrivaled implementation flexibility.

BRIEF DESCRIPTION OF THE DRAWINGS

FIG. 3a relates more particularly to variform stator paradigms, while FIG. 3b relates more particularly to variform rotor paradigms;

FIGS. 7a-c are cross-sectional views taken relative to line 2-2 of FIG. 1, exhibiting the profound morphological consequence that altering the number of stator blades will have on structural proportions. FIG. 7a emphasizes the moderate embodiment featured as FIG. 1, while FIGS. 7b-c exemplify the ample morphological variances proffered by the present invention;

FIG. 8a emphasizes the moderate embodiment featured within FIG. 1, while FIGS. 8b-d exemplify the ample morphological variances proffered by the present invention;

FIG. 9a discloses an embodiment employing both upper and lower annular plates. FIG. 9b typifies a variation, in which, the upper stator blades are attached to an annular conical sail, while the lower stator blades employ an annular plate. FIG. 9c exemplifies a variation, in which, the upper stator blades are attached to an annular plate, while the lower stator blades employ an annular conical sail. FIG. 9d demonstrates a variation, in which, both the upper and lower stator blades are secured to annular conical sails, and further discloses the established angular variances of the annular conical sails, according to the present invention;

FIG. 10b illustrates a stacked morphological rotor construct that may be employed within the stator structure shown in FIG. 10a;

FIG. 11b illustrates a stacked morphological rotor construct that may be employed within stator structures shown in FIGS. 11a, 12a, and 13a;

FIG. 12b is identical to FIG. 11b, and may be likewise employed within the stator structures of FIGS. 11a, 12a, and 13a;

FIGS. 13a-b are three-dimensional elevation views that demonstrate a stacked implementation of the present invention; wherein, FIG. 13a is identical to FIG. 12a, and FIG. 13b discloses a three-tiered morphological rotor variation, having elongated airfoils and a centralized vertical spindle, and which may be likewise employed within the stator structures of FIGS. 11a, 12a, and 13a;

FIG. 15a demonstrates the adjunct utilization of electrical deicing equipment, while FIG. 15b illustrates an application of photovoltaic cells;

FIGS. 17a-c represent cross-sectional views of prior art designs. FIG. 17a is a cross-sectional view of the patented referent apparatus, while FIGS. 17b-c exemplify two developmental prototype designs having unidirectional airfoils as stator blades.

DETAILED DESCRIPTION

Figure 1:
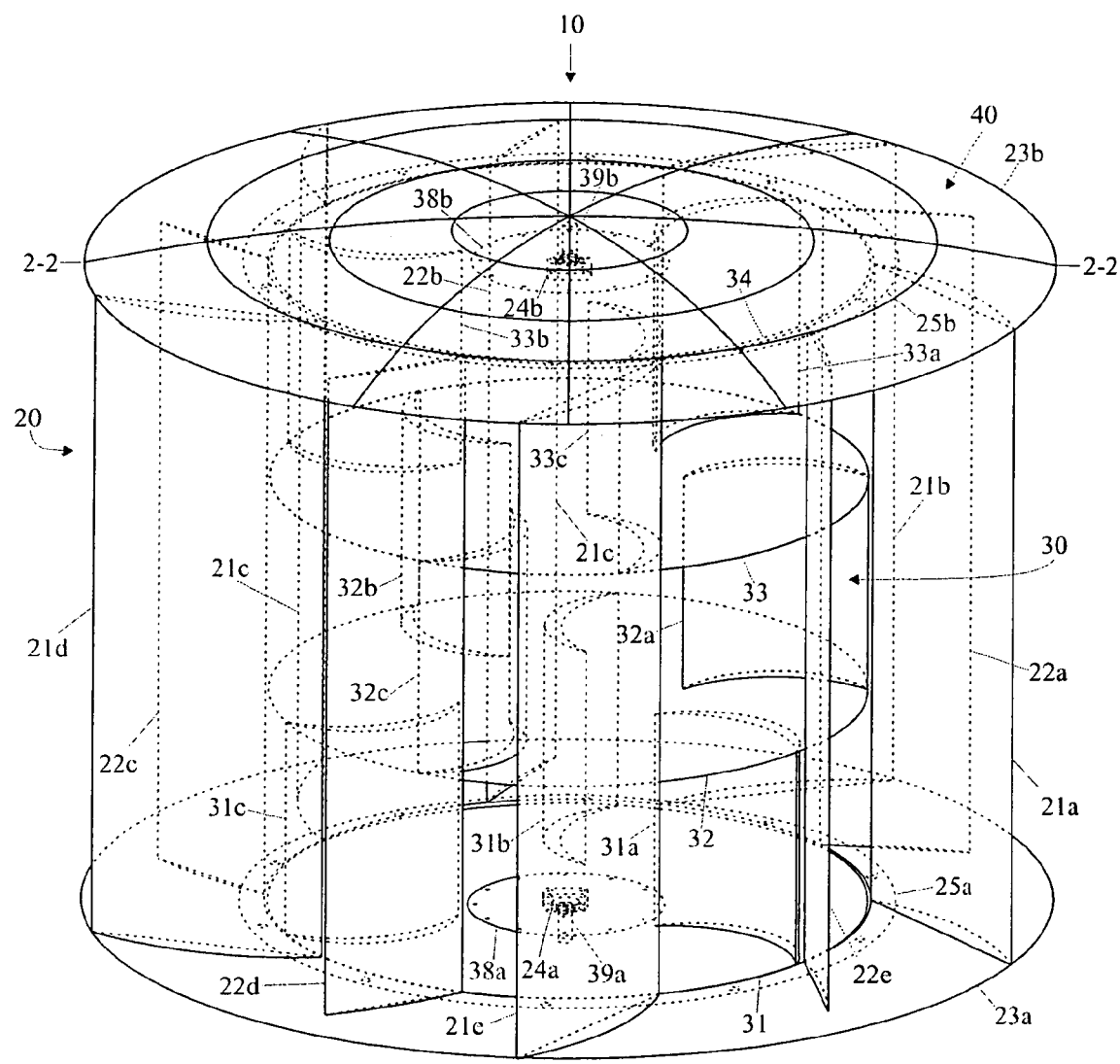
FIG. 1 is a three-dimensional elevation view of the featured embodiment of a single-stage, vertical-axis, aerodynamic-hybrid wind turbine, optimized for a typical northern hemisphere implementation, according to an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Various aspects of vertical axis wind turbines are discussed in U.S. Pat. No. 6,020,725 to Roberts and U.S. Pat. No. 6,465,899 to Roberts, which are incorporated by reference.

Referring more particularly now to the drawings of the present invention, FIG. 1 exemplifies a vertical-axis aerodynamic-hybrid wind turbine 10, having an intentionally open-ended mounting strategy. The turbine includes an annular stator 20 that circumscribes a multi-tiered cylindrical rotor construct 30. Stator 20 of FIG. 1 has upper and lower annulus blade support plates or collars 23a-b. These collars are attached to the annular upper and lower bearing support plates 25a-b, respectively. Both upper and lower annular bearing plates 25a-b are fastened to the upper and lower blade support collars 23a-b, to facilitate the removal of the rotor 30. The upper and lower stator blade support collars 23a-b are connected via a plurality of vertically disposed primary stator blades 21a-e and secondary stator blades 22a-e, each of these blades have both a planar and convex side.

Figure 3A:
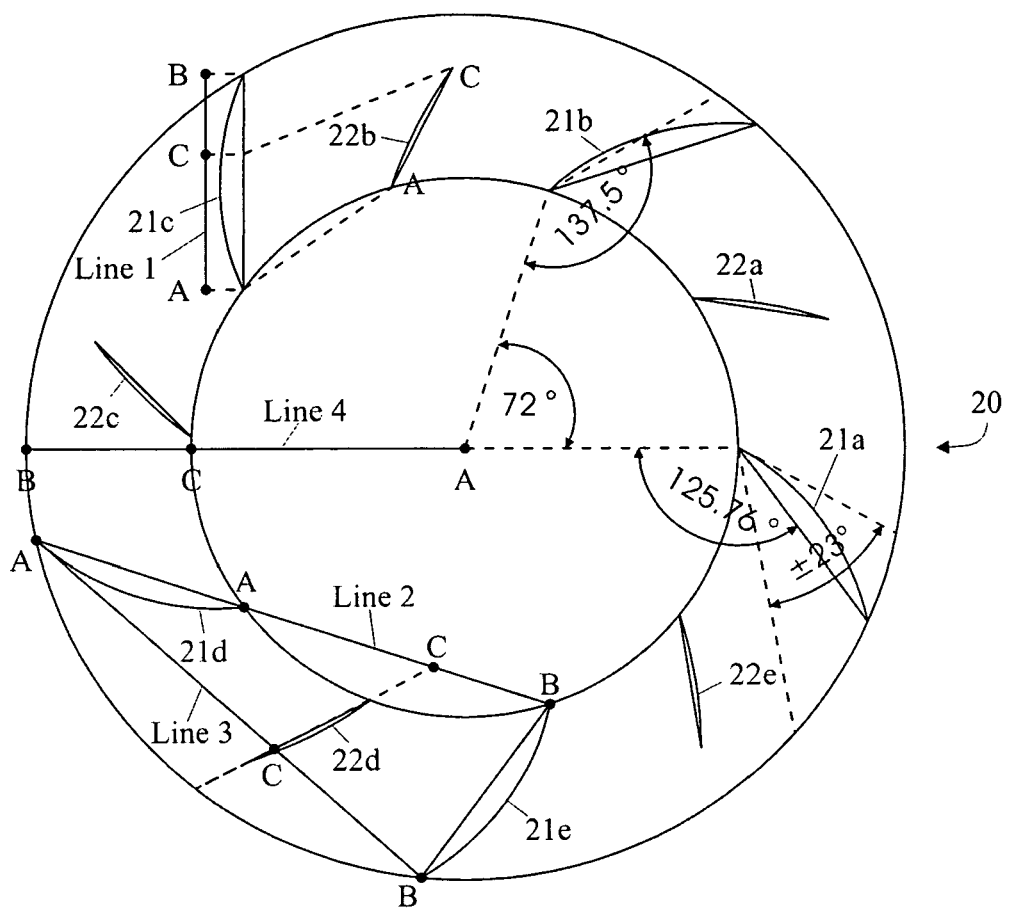
FIGS. 3a-b is a cross-sectional view taken along line 2-2 of FIG. 1, disclosing the mathematical, angular, and morphological relationships relative to the featured embodiment of the present invention.
Figure 3B:
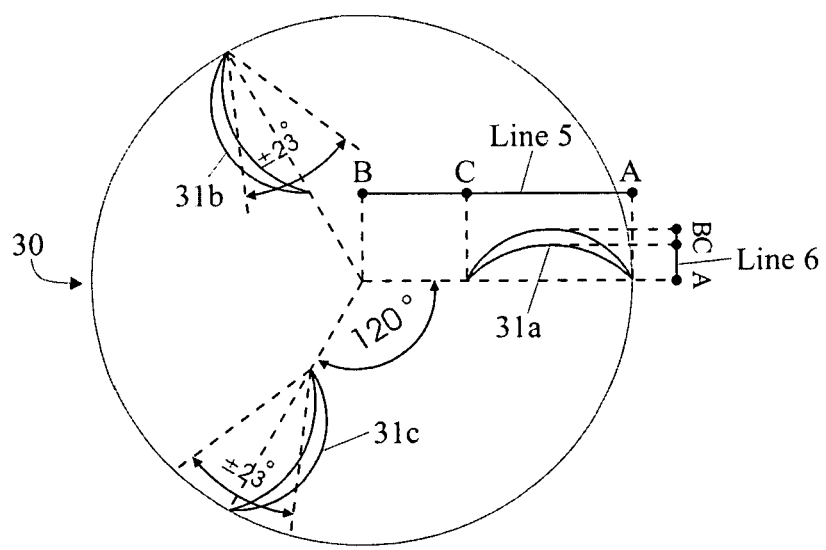

The primary stator blades 21a-e are arrayed evenly about the rotor 30 at 72 degree intervals, and their chord is skewed helically inward toward the rotor at an angle of 125.76 degrees, with respect to the radius of said rotor, forming a preferred angle of 137.5 degrees (360 degrees·$Ø^2$), with respect to its inner half-chord alignment, as shown in FIG. 3b. Thus, the planar side of the stator blades can be oriented with respect to a plane passing through the vertical axis and a tip of the stator blade between 103 to 149 degrees.

The convex sides of the primary stator blades 21a-e are curved on radii equal to the inside radius of the circumferential stator 20, which is fundamentally equal to the outside radius of rotor 30, and have chord lengths of sufficient breadth, so as to enable said primary blades to traverse the annulus support collars 23a-b with respect to their ascribed angular orientation.

The secondary stator blades 22a-e are vertically interleaved, forming aerodynamic slots in relation to each primary stator blade, substantially increasing the composite aerodynamic efficiency. In this case, the aerodynamic slots act like a jib on a sail boat by augmenting the functionality of the primary stator blades, while concurrently reducing turbulence within the airflow reaching the rotor 30.

The convex sides of primary stator blades 21a-e and secondary stator blades 22a-e are invariably oriented to be on the same side with respect to the convex sides of adjacent rotor airfoils 31a-c, 32a-c, and 33a-c, thereby, inducing a laminar flow of wind to traverse both the convex-leading and concave-trailing sides of the rotor airfoils 31a-c, 32a-c, and 33a-c, effectively optimizing the present invention for aerodynamic lift. Thus, the convex side of the stator blades and the convex leading side of the rotor airfoils are oriented to face circumferentially around the vertical axis in a common direction, or in the same direction.

Referring briefly to FIG. 3a, and more particularly to line segment AB, designated as Line 1 of FIG. 3a, it can be seen that the length of secondary stator blade 22b is a geometric proportion of the length of primary blade 21c; wherein, the length of primary blade 21c and line segment AB are equal. Length AB of stator blade 21c is divided into two segments forming segments AC and CB; wherein, the ratio of the length of the longer segment AC to the length of the primary blade length AB is equal to the ratio of the length of the shorter segment CB to the length of the longer segment AC. A preferred section is thus created by point C on line segment AB if AC/AB=CB/AC. Thus it can be seen that the length of the secondary stator blades 22a-e of FIG. 3a, and hence those of FIG. 1, are equivalent to the length of the primary blades multiplied by the numerical value phi (the preferred ratio). Looking further to FIG. 3a, it should be noted that secondary blade, or slot 22d, is aligned so as to have its chord in direct alignment with the dashed line drawn between point C of Line 2 and point C of Line 3. Thus, preferred sections are derived by dividing inner and outer distances AB, between the primary stator blades 21d and 21e. The convex sides of secondary stator blades 22a-e are curved over their chord lengths on radii equal to the outside radius of the circumferential stator 20. Line segment AB of FIG. 3a, denoted as Line 4, represents the radius of stator 20. Segment AC of Line 4 represents a preferred section of the stator 20 radius, and is approximately equal to the radius of rotor 30 of FIG. 3b, as well as that of FIG. 1. Segment CB of Line 4 is equal to the width of the upper and lower stator blade support collars 23a-b.

The use of preferred sections, as described in the foregoing design criteria, results in an apparatus having a stator/rotor structural proportion ratio equal to phi. Betz Law suggests that air may only be naturally compressed through a vortex or narrowing channel up to about $16/27$, or the approximate numerical value of 0.5925. Thus, the wind compression ratio of FIG. 1, closely approximating Betz Law, establishes this particular embodiment as a moderate design implementation of the present invention.

The rotor 30 can have rotor airfoils 31a-c, 32a-c, and 33a-c each having a horizontal cross-section with a crescent shape, including a convex leading side and a convex trailing side, and with a thicker middle section that tapers to narrower sections at ends. Both the leading and trailing sides are solid surfaces. An airfoil employed on a vertical-axis can be said to have bidirectional attributes only when it exhibits horizontal-plane symmetry. In other words, vertical bisection produces two halves that are mirror images of each other. Primitives of this design concept can be formed by taking two traditional airplane wing airfoils, and fuse them together at their leading edges, such, that their combined shape would be uniformly convex. However, the resulting composite airfoil would be too convex on the wind trailing side to serve as an effective wind sail. One effective and efficient correction is realized through the utilization of a crescent shaped airfoil. The concave region of the trailing side of a crescent shaped airfoil makes for a very effective wind sail. Furthermore, without this concavity the Coanada Effect would not be as pronounced, because the airfoil would tend to be pulled in both directions whenever its mean camber line was parallel to oncoming wind, effectually nullifying the effect.

The rotor 30 of FIG. 1 is shown having three sections, or tiers, separated by circular airfoil support plates 31, 32, 33, and 34. Each tier employs three, crescent shaped, bidirectional airfoils 31a-c, 32a-c, and 33a-c, sandwiched between upper and lower circular airfoil support and partitioning plates. The chord lines of the rotor airfoils are equal to a preferred section of the rotors radius, as detailed by Line 5 of FIG. 3b. The chord of bidirectional airfoil 31a is a preferred section of the radius of rotor 30, represented by line segment AB, and depicted as Line 5 of FIG. 3. The outer curvature of the crescent shaped, bidirectional, airfoils 31a-c, 32a-c, and 33a-c are set at a radii substantially equal to the radius of the rotor 30. The camber of the bidirectional airfoils 31a-c, 32a-c, and 33a-c of rotor 30 are a preferred sections of their chord height, as indicated by line segment AB, distinguished by Line 6 of FIG. 3b. Thus, the center of the rotor 30 is open between the rotor airfoils which are spaced apart radially from the vertical axis without any structure between the rotor airfoils and the vertical axis. The diameter of the open center can be approximately 38% of the outer diameter of the rotor.

The open mid-section of the rotor can be an important design characteristic of the referent apparatus. Historically speaking, the vast majority of vertical-axis wind turbine designs have not been successful, primarily, due to their inherent inefficiencies resulting from back pressure, and a naive reliance on drag forces to induce torque. A plethora of failed endeavors litter the vertical-axis wind turbine graveyard. Most of these innovative, albeit elaborate, attempts remain unrewarded, because they were never shown to be economically, environmentally, or technologically competitive. The vertical-axis wind turbine having an open center of the present invention results in a device that is inexpensively constructed, environmentally friendly, virtually silent, and remarkably efficient due to its potential to employ both aerodynamic lift and drag forces. Furthermore, because the rotor is encompassed by a stator, the device is unusually safe, and counteracting wind/back pressures are virtually eliminated. Another improvement could be made to the referent device by removing the centralized vertical spindle.

One exception to this advancement may be realized in large-scale models, or units operating in extreme environments, where an appropriately sized spindle would provide enhanced structural integrity. Moreover, a spindle utilized for this purpose may be reduced in diameter, with respect to any connective energy conversion couplings, in order to minimize the consequent central obstruction while providing enhanced structural integrity.

The rotor airfoils of each tier are positioned at 120 degree intervals, adjacent to the periphery of their associated support plates, and their chord lines are substantially perpendicular to the axis of rotation. The airfoils of subsequent tiers are collectively and incrementally skewed, with respect to the base tier, using the formula: 120 degrees divided by the number of tiers. Moreover, a single rotor assembly may have as many as 120 tiers before a subsequent tier would have the same angular orientation as the first. The position of the airfoils provides an unobstructed airflow through the mid-section of rotor 30, and provides smooth, continuous aerodynamic lift (torque).

Circular plates 31, 32, and 33 are each attached or secured to their respective airfoils, as they are stacked, by means of circular plate 34, allowing the entire stack to rotate as a single unit. The rotor stack is supported for rotation by the upper and lower bearing support plates 25a-b, and thrust and journal bearings 24a-b, respectively, as shown in FIG. 1. The upper and lower bearing support plates 25a-b are attached to upper and lower stator blade support collars 23a-b, via a bolt-ring, facilitating the removal of rotor 30. The upper and lower spindles 39a-b are secured to upper and lower spindle plates 38a-b, respectively, and said spindle plates are attached to upper and lower circular airfoil support and partitioning plates 31 and 34, via a bolt-ring, facilitating the removal of rotor 30. The distal end of the rotor spindle 39a extends beyond the bottom of turbine 10, for connection to mechanical drives or electrical generators, etc.

An amygdaloidal weather guard top or crown 40 is mounted on the upper surface stator blade support collar 23b to shield the turbine from atmospheric precipitation, minimize turbulence, and protect any mechanical or instrumental members employed at the summit, such as bearings and/or ancillary weather monitoring devices. Those skilled in the art will recognize how the central portion of weather guard 40 may be designed with a removable access port, in order to facilitate maintenance and repairs.

Figure 2:
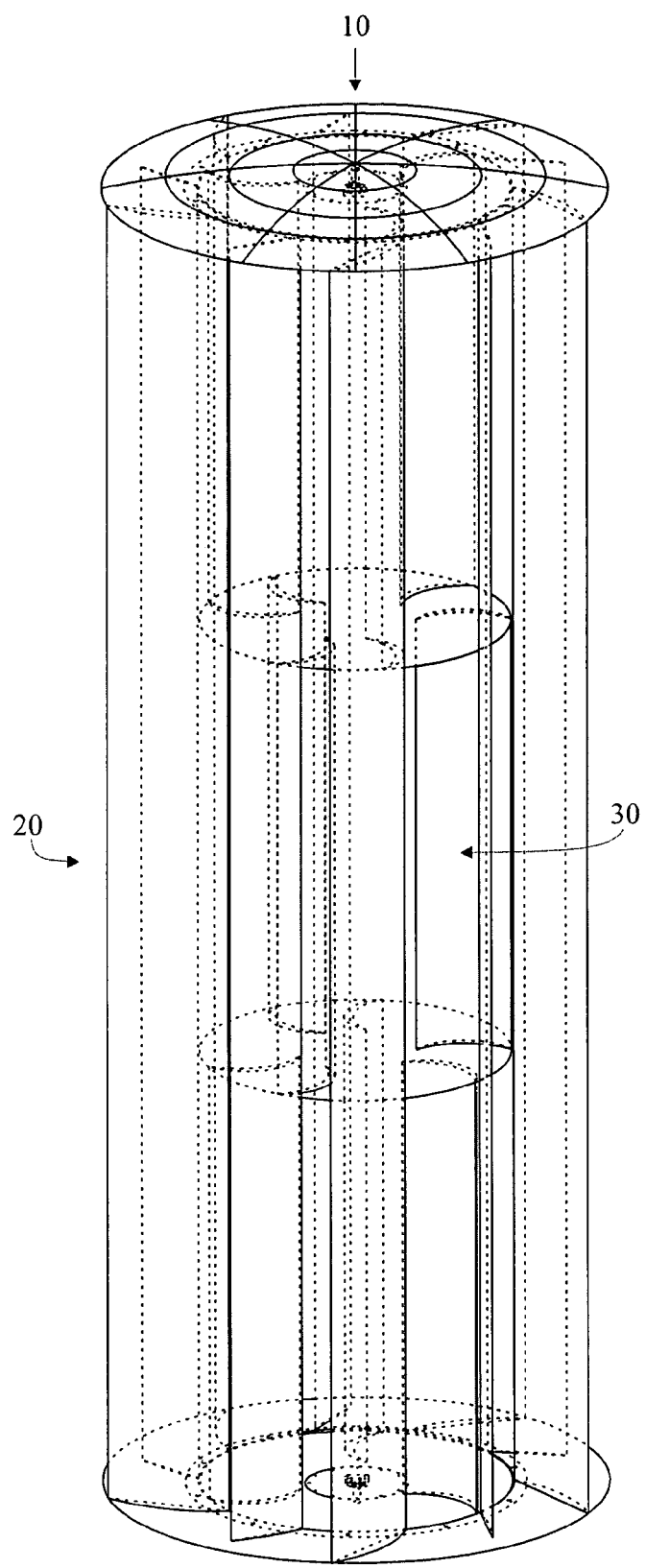
FIG. 2 is a three-dimensional elevation view of the featured embodiment exhibited in FIG. 1, elongated in order to illustrate the variform aspect ratio morphology in accordance with an embodiment of the present invention.

FIG. 2 of the drawings of the preferred embodiments differs from FIG. 1 only by aspect ratio, effectively demonstrating one of the many variform morphological features of the present invention. The vertical vs. horizontal elongation of the crescent shaped, bidirectional, airfoils allow for simple but effective design control over the aerodynamic lift characteristics of the present invention.

Focusing attention once again to FIG. 3a, additional, variform, morphological paradigms of the present invention are disclosed. The primary stator blade 21a, and hence each of the primary stator blades 21a-e, may be modified by adjusting the skew of the blade, helically inward, by a ∀ 23 degrees from the normal arrangement angle of 125.76 degrees, with respect to the radius of rotor 30. Likewise, FIG. 3b defines how the crescent shaped, bidirectional airfoils or rotor 30 may be reoriented, or skewed, with respect to the typical placement, as defined by the disclosed specifications of rotor airfoils 31b-c. Thus, the rotor airfoils can be oriented at an angle with respect the vertical axis between 0 to 23 degrees in either direction. These modifications comprise discretionary design criteria that may be exercised, in order to govern specific performance and control parameters of the present invention, for various installation site environments.

Figure 4A:
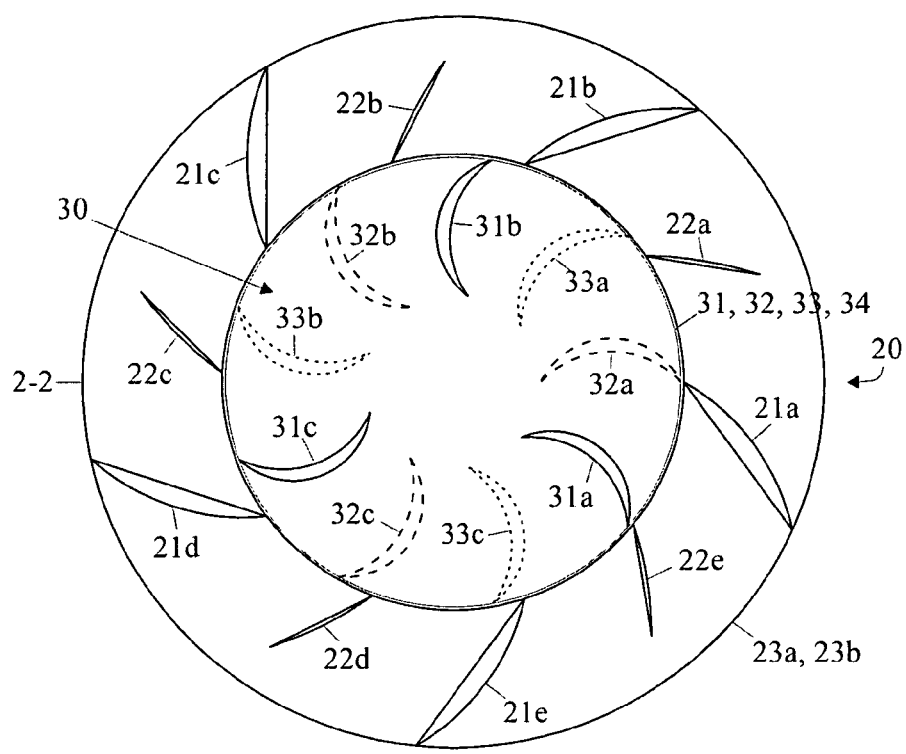
FIG. 4a is a cross-sectional view taken along line 2-2 of FIG. 1, depicting an exemplary stator and rotor morphological construct, optimized for a typical northern hemisphere implementation, according to the present invention.
Figure 4B:
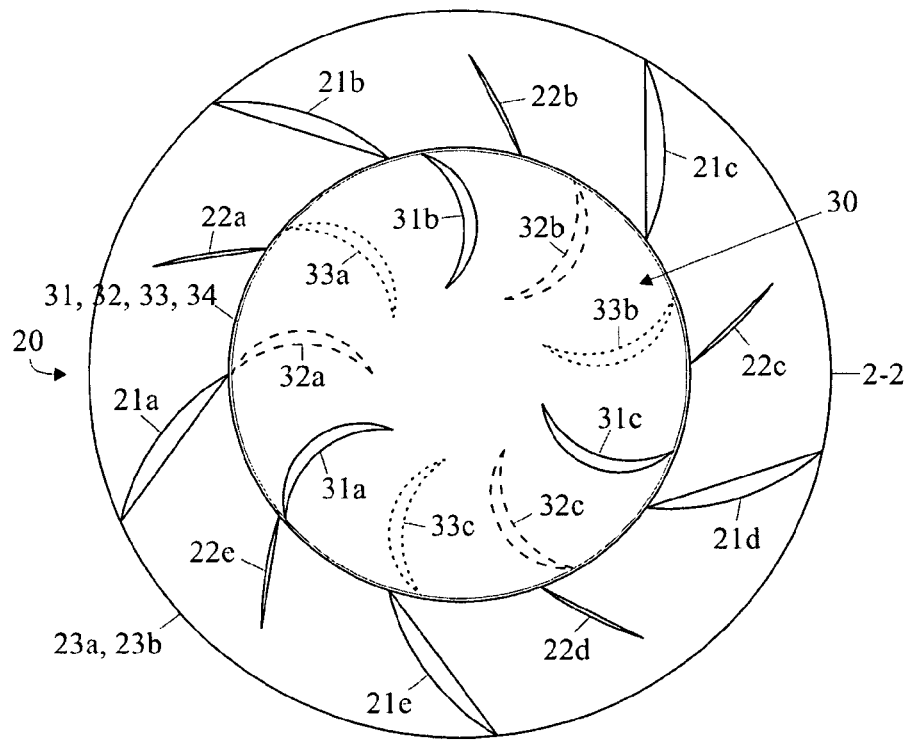
FIG. 4b is a mirror image of FIG. 4a, depicting a reversed helix, facilitating an optimized southern hemisphere implementation.

Directing attention more specifically to FIG. 4a and FIG. 4b, of the drawings of the present invention, yet another discretionary, polymorphic turbine design choice is disclosed for optimization of the present invention; wherein, the stator 20 and rotor 30 combination shown in FIG. 4a is constructed with a left or counterclockwise helix for operation in the northern hemisphere, while the stator 10 and rotor 20 combination shown in FIG. 4b is constructed with a clockwise or right helix for operation in the southern hemisphere. Those skilled in the art will understand and appreciate the importance of elective reversal of the angles and orientation of both the stator and the rotor, of the present invention, in order to correct for the antipodal Coriolis Forces, known to exist between the northern and southern hemispheres of the earth.

Figure 5A:
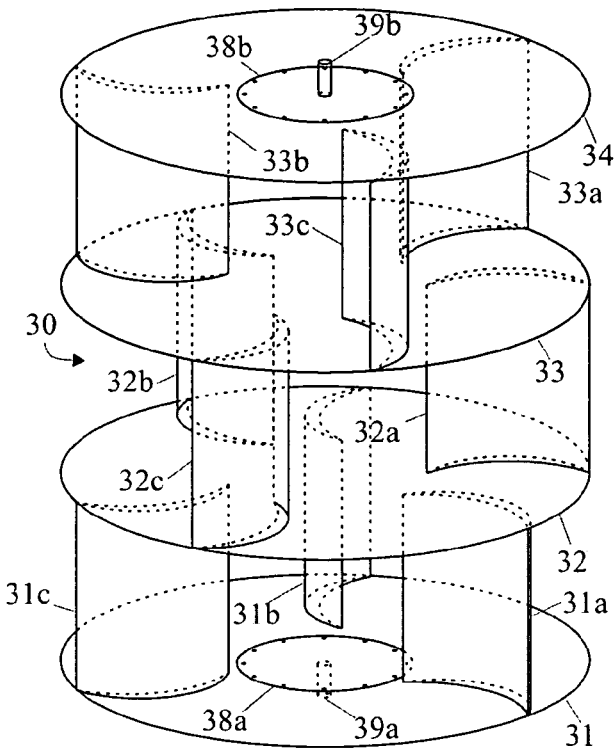
FIG. 5a is a three-dimensional elevation view of the featured, three-tiered, morphological rotor construct employed within the embodiment of FIG. 1, further expounding constituent details.
Figure 5B:
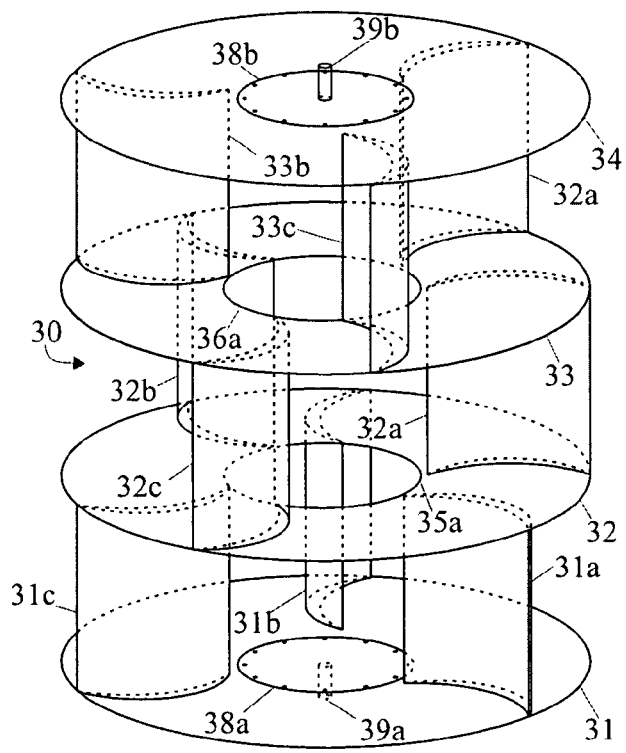
FIG. 5b is a three-dimensional elevation view of an alternative rotor innovation of the present invention, which may be optionally employed within the embodiment of FIG. 1, illustrating the use of annulus airfoil-tier partitions instead of plates.

Examining more fully, the details of rotor 30 of the present invention, FIG. 5a illustrates a three-dimensional elevation view of the featured, three-tiered, morphological rotor construct, employed within the embodiment of FIG. 1, expounding more completely its constituent details. FIG. 5b is a three-dimensional elevation view of an alternative rotor innovation of the present invention, which may be optionally employed within the embodiment of FIG. 1, illustrating the use of annulus airfoil-tier partitions instead of plates. These annulus partitions may be employed as an effective way of reducing the weight of the rotor construct, when deemed important, as a design feature for particular sites or implementation benefits.

Figure 6A:
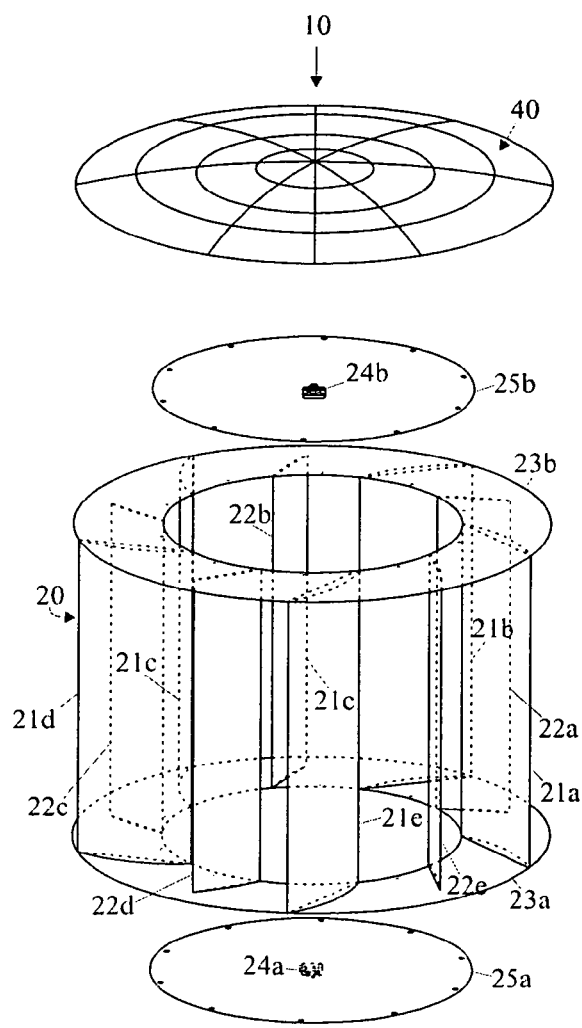
FIG. 6a is an exploded, three-dimensional, elevation view of the stator exhibited within the embodiment of FIG. 1, revealing its cage-like, helical morphology, and the utilization of an exemplary weather-guard crowning structure.
Figure 6B:
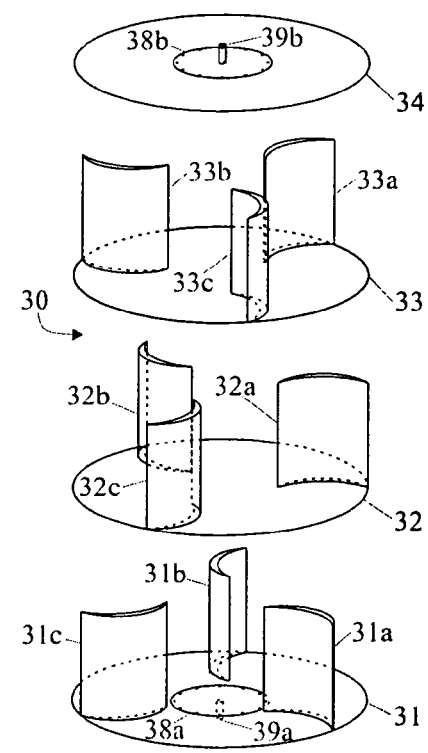
FIG. 6b is an exploded, three-dimensional, elevation view of the rotor exhibited within the embodiment of FIG. 1, which may likewise be employed within the stator shown in FIG. 6a, demonstrating its multi-tiered morphology.
Figure 8A:
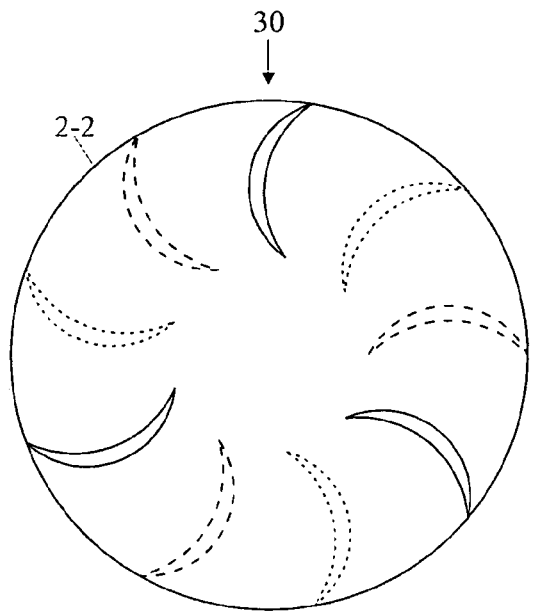
FIGS. 8a-d are cross-sectional views of multi-tiered, variform, rotor constructs taken relative to line 2-2 of FIG. 1. These serve to illustrate the gradatory consequence variant airfoil-tier combinations will have on overall structural dynamics.
Figure 8B:
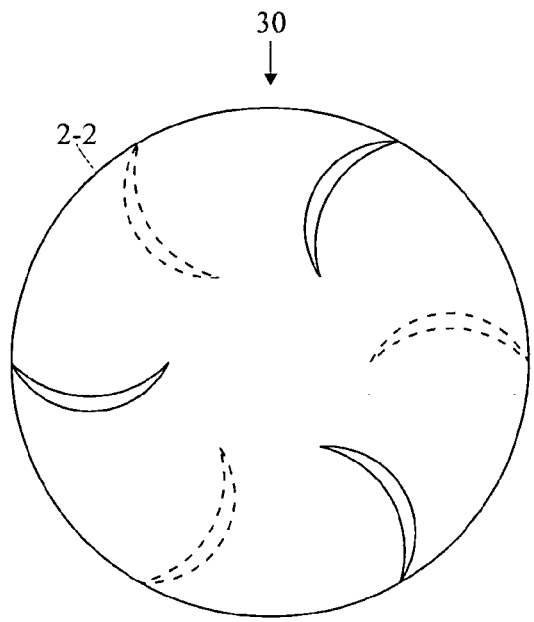
Figure 8C:
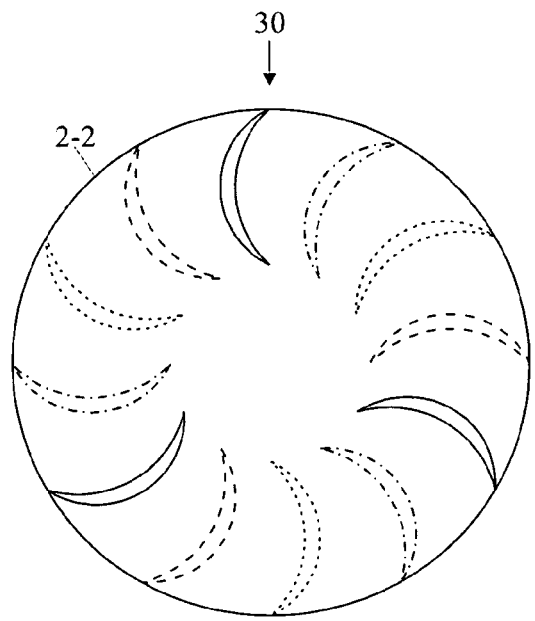
Figure 8D:
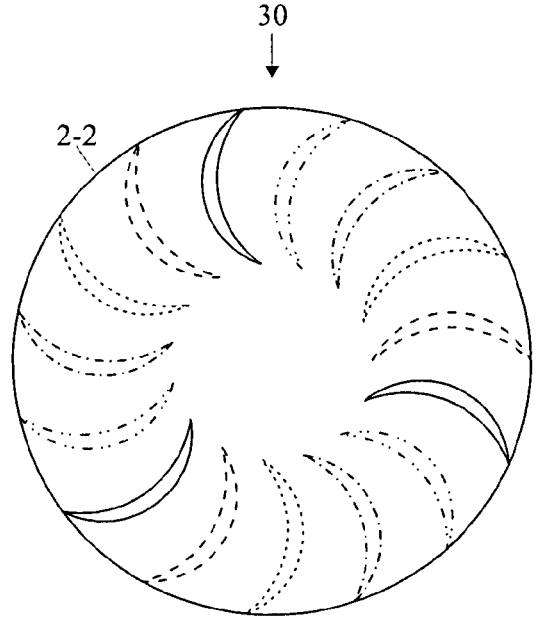

The drawings or illustrations contained in FIG. 6a and FIG. 6b are included only as an effective means for graphically representing, more clearly, turbine 10 disclosed in FIG. 1 of the preferred embodiments of the present invention. FIG. 6a is an exploded, three-dimensional, elevation view of the stator exhibited within the embodiment of FIG. 1, revealing its cage-like, helical, morphology, and the utilization of an exemplary, weather-guard, crowning structure. FIG. 6b is an exploded, three-dimensional, elevation view of the rotor exhibited within the embodiment of FIG. 1, which may likewise be employed within the stator shown in FIG. 6a, demonstrating its multi-tiered morphology.

Wind entering the turbine 10 of FIG. 1, from any horizontal direction, does so via the narrowing channels of stator 20, established by its plurality of vertically disposed primary blades 21a-e and secondary blades 22a-e. Accordingly, the air is focused helically inward toward the rotor 30. Also, in response to the constriction of the portal or airflow passageway of the stator 20, and in conformity with Bernoulli's Law, the velocity of the wind increases, and the air pressure within the channel drops proportionately, exerting less lateral pressure on both the planar and convex sides of the stator's deflecting blades 21a-e and 22a-e. Also, in accordance with the conservation of energy principle associated with fluids, the kinetic energy of the air mass entering the turbine increases in the immediate area of rotor 30, at the expense of a pressure drop within the stator's narrowing channels, contributing to a substantial increase in the overall potential energy available to react with, or be transferred to, each of the crescent shaped, bidirectional, airfoils 31a-c, 32a-c, and 33a-c of the rotor 30.

When the rounded or convex sides of the rotor's crescent shaped, bidirectional airfoils come in contact with this intensified and concentrated air stream, being channeled inwardly toward rotor 30, the air mass will try to follow the curved surface of the airfoil rather than flow in a straight line, due to the viscosity of the air "boundary layer" encapsulating all surfaces. This tendency of fluids to follow a curved surface is known as the Coanada effect. From Newton's first law we know that for a fluid to bend there must be a force acting upon it. From Newton's third law we know that the fluid must apply an equal and opposite force on the airfoil. This force causes the airfoil to try and move directly into the center of the air stream, rather than away from it due to a reduction in air pressure on its convex or leading side, resulting from an increased air velocity over its surface. Those skilled in the art refer to this force as aerodynamic lift, which in turn, produces torque against the rotor causing it to turn. As the rotor turns, and individual rotor airfoils progress toward the developing low pressure region of the oncoming air stream, the camber side of these airfoils incrementally and continuously become more advantageously oriented, relative to the airflow, producing an incremental increase in the overall torque exerted upon rotor 30. This process continues for 90 mechanical degrees, for each airfoil, until they reach a fully cupped position with respect to the oncoming wind stream, at which point, the attack angle of these bidirectional airfoil blades reverse, and aerodynamic lift is applied in the opposite direction, in direct proportion to the angle of attack, thus a continuous application of torque is induced upon the rotor for this entire 180 degree period of rotation.

As soon as the oncoming air is spent, by delivering its energy to the rotor 30, it exits the distal side of the turbine through one of the expanding apertures of the stator 20, created by its vertically disposed primary and secondary blades, and a reverse scenario then ensues in accordance with Bernoulli's Law—the velocity of the air stream decreases, the air pressure increases, and the kinetic energy of the air mass leaving the turbine decreases allowing the air to move rapidly away from the turbine, and mix quickly and evenly with the circumferentially disposed air flowing about the periphery of the turbine's stator 20.

This circumferential flow of air around the turbine plays yet another role relative to the efficient and effective operation of the turbine of the present invention, in that, as the air flows around the outer boundary of the stator 20 its velocity accelerates, inducing an area of significant low pressure on the wind-shade stator blades. This "Venturi Effect," or vacuum, not only eliminates back pressure, but adds considerably to the overall torque potential of turbine 10. Thus, according to Bernoulli's Law, significant aerodynamic lift is thereby induced upon these returning rotor airfoils, for the remaining 180 degrees of rotation, as exit winds are literally drawn out of the present invention at this critical juncture. Moreover, the crescent shape of these airfoils, in concert with their boomerang like gyrations, provide an ideal mechanism for both capturing and releasing the wind as it flows through the turbine; exhibiting the same synchronized efficiency as two properly designed interlocking gears.

From the above disclosure, those skilled in the art will begin to recognize the comprehensive scope and design flexibility that is possible, with respect to the present invention, which yields numerous efficacious variations as to the number of stator blades, rotor tiers etc., as will become apparent in the ongoing description, and as is expressly covered by the claims. For example, and as exemplified in FIGS. 7a-c, there are profound morphological consequences that result from altering the number of stator blades relative to the structural proportions of both the stator and the rotor. FIG. 7a emphasizes the moderate embodiment featured as FIG. 1, while FIGS. 7b-c exemplify the ample morphological variances proffered by the present invention. As can be seen by these examples, changing the number of stator blades significantly affects the ratio of stator vs. rotor area. Due to the variety of applications wherein the present invention may be installed, these morphological alternatives comprise an essential design characteristic that may be employed while engineering various embodiments tailored to produce specific power curves, etc.

Another example of design flexibility may be realized by referring to FIGS. 8a-d, which demonstrate several possible variations relative to the employed number of rotor tiers. The higher the number of rotor tiers, the smoother the mechanical output of the turbine will be. As might be expected, one of the governing factors, as to the number of desirable tiers, is predicated on the overall cost and stability of the embodiment with respect to the intended market and/or application.

Another aspect with regard to the variform design flexibility of the present invention consists in the choice of several stator constructs, which may be utilized in a variety of useful combinations. Several of these stator constructs are illustrated in FIGS. 9a-d. When understood, those skilled in the art will recognize yet other variations, not shown, but which may be utilized by the present invention, as covered by the claims.

Figure 9A:
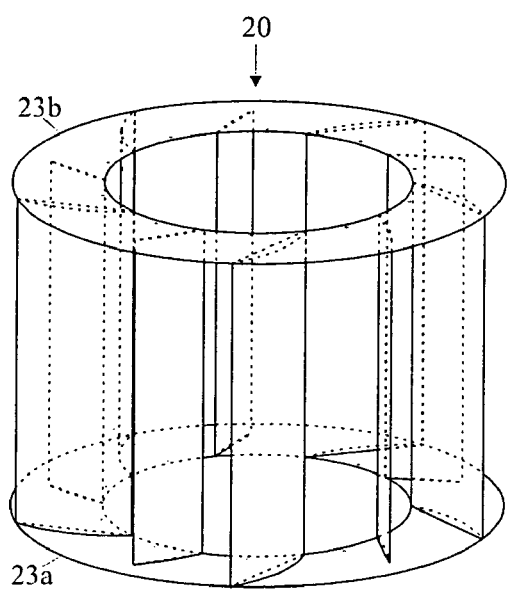
FIGS. 9a-d are three-dimensional elevation views of an archetypical stator construct, disclosing the four primary morphological stator paradigms.

Looking particularly now at FIG. 9a, illustrated is a stator construct that has been designed to ameliorate the stacking of stator-upon-stator in a tower arrangement. Typical prior art turbines are installed atop large towers, in order to take advantage of the increasing wind speeds at higher altitudes, but do so at expense of increase manufacturing costs. The ability of the present invention to stack one turbine unit above the other accomplishes the same goal with a faster return on investment, because there is very little non-energy producing infrastructure. Stacking also provides one method for increasing the aspect ratio of the turbine without expensive transportation and tooling costs.

Figure 9B:
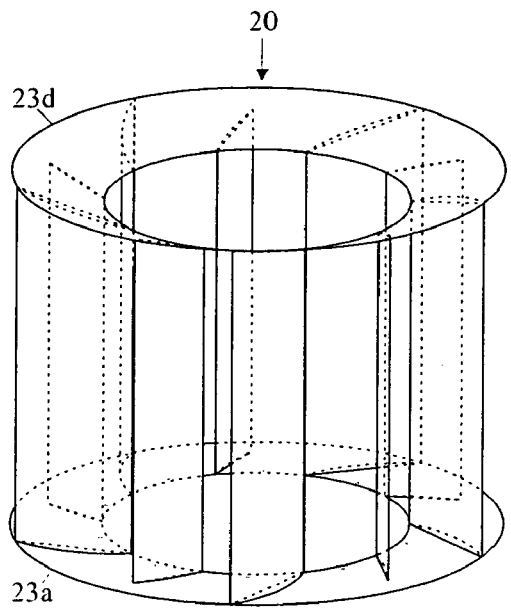
Figure 9C:
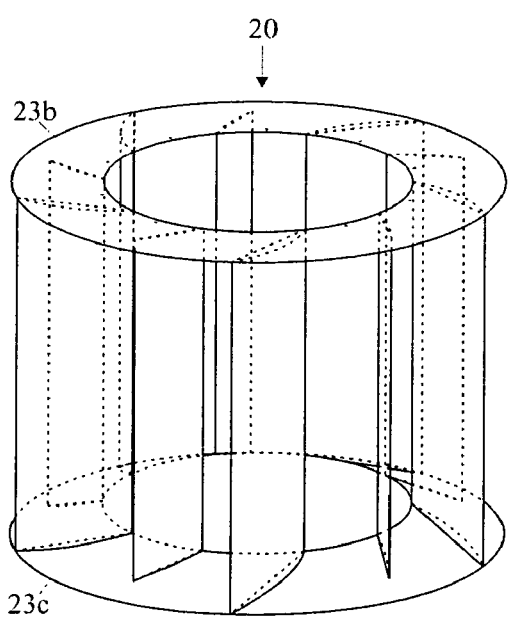
Figure 9D:
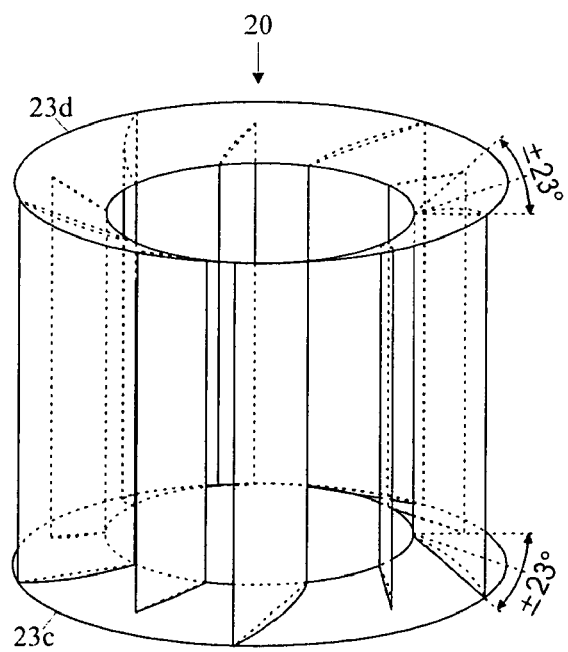

FIG. 9b illustrates a stator section that could be utilized as the crowning section atop a stack due to its upper conical sail. Having a conical sail is not a requisite of the present invention, but does provide slightly greater efficiencies, especially, when employed at the end points, such as at the very top or bottom of a stack. Accordingly, FIG. 9c illustrates a stator section that could be employed as a base section, due to its having a lower conical sail. FIG. 9d illustrates a stator section having both an upper and lower conical sail. Upper conical sails slope vertically downward at substantially a negative twenty-two degrees, with inner vertices intersecting the horizontal vertices of the upper bearing support plate of the stator. Likewise, lower conical sails slope vertically upward substantially at a positive twenty-two degrees, with inner vertices intersecting the horizontal vertices of the lower bearing support plate of the stator. The angles of both upper and lower conical sail may be strategically modified for various implementations, having a comprehensive angular variance of ∀23 degrees, as disclosed in FIG. 9d. However, FIG. 9d with its upper and lower conical sails does not illustrate a cost effective, stackable, stator construct, but could be reasonably employed as a single-stage embodiment having augmented aerodynamic efficiency. The use and importance of having a variety of stator and rotor constructs of the present invention will be realized more fully as the description continues.

Figure 10A:
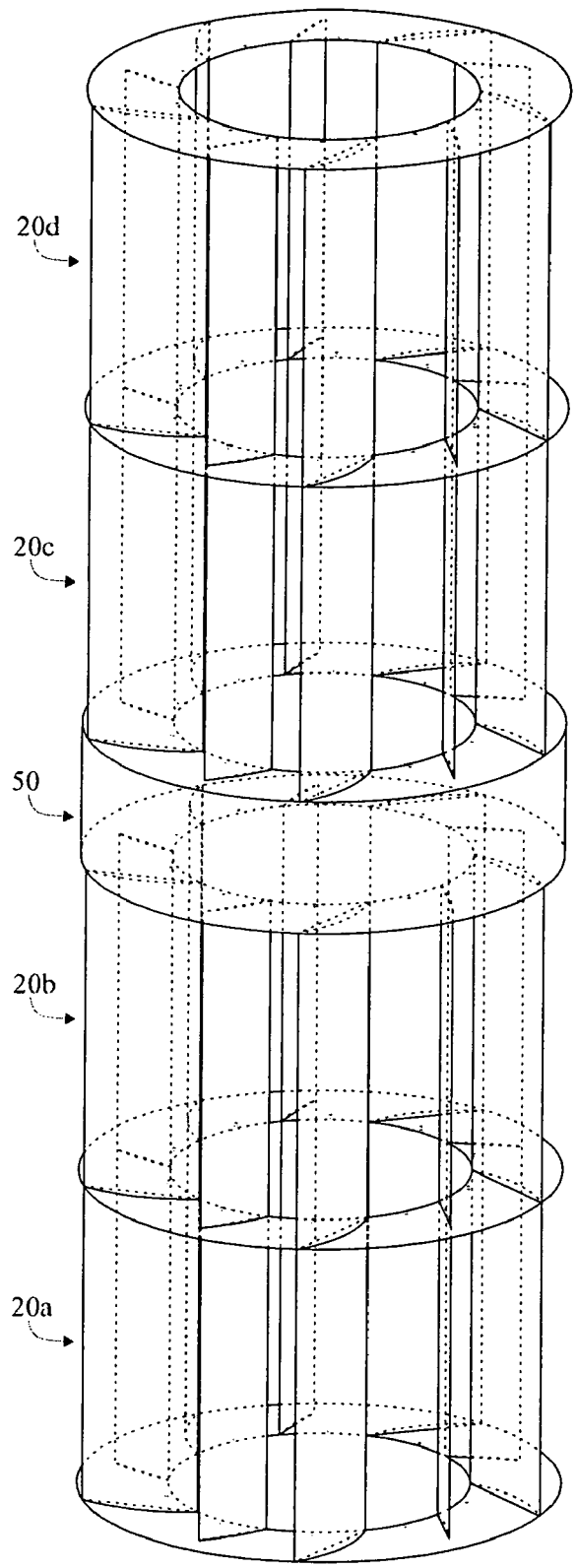
FIGS. 10a-b are three-dimensional elevation views that demonstrate a stacked implementation of the present invention; wherein, FIG. 10a discloses a potential, four-tiered, morphological stator construct having a centralized energy conversion nexus.
Figure 10B:
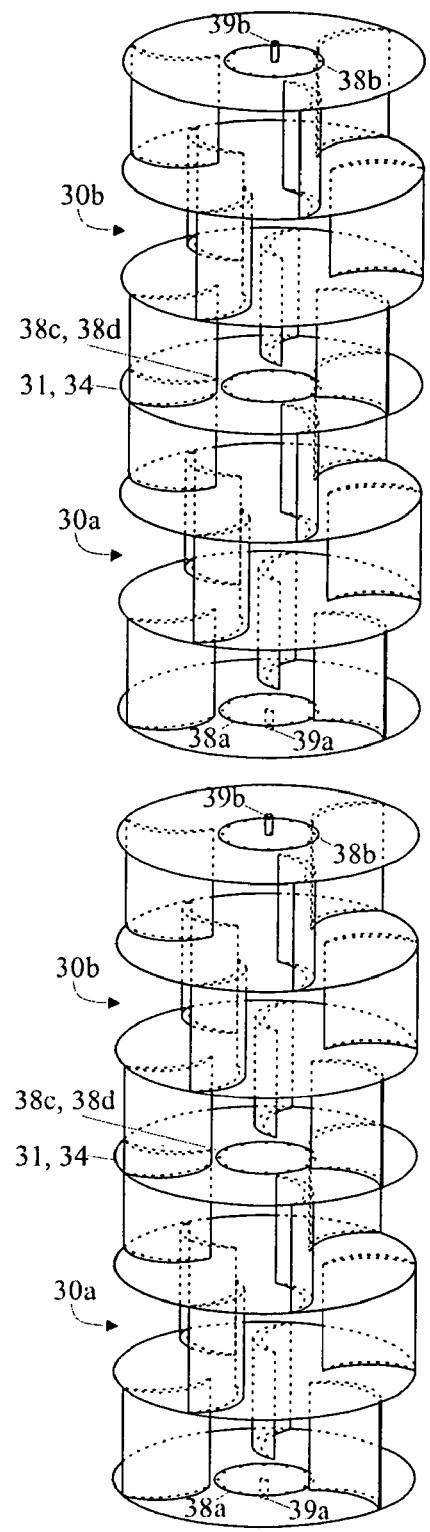

FIGS. 10a-b are three-dimensional elevation views that demonstrate a stacked implementation of the present invention. FIG. 10a discloses a potential turbine stacking arrangement, consisting of four stator tiers 20a-d, having a centralized energy conversion nexus 50. A complimentary rotor construct which may be utilized within the turbine of FIG. 10a is illustrated in FIG. 10b, and illustrates how two, three-tiered, rotors 30a-b may be connected by means of rotor consolidation plates 38c and 38d.

Rotor consolidation plate 38c is placed on top of circular airfoil support and partitioning plate 31 of rotor 30b, and consolidation plate 38d is placed on the underside of circular airfoil support and partitioning plate 34 of rotor 30a. The two are then bolted together, thereby, allowing rotors 30a-b to operate as a single unit. As further illustrated in FIG. 10b, rotor sections so combined may be utilized within the stacked stator construct of FIG. 10a, so as to permit the rotor spindle 39b, of the lower rotor stack, to enter the energy conversion nexus 50 from the bottom, and the rotor spindle 30a, of the upper rotor stack, to enter energy conversion nexus 50 from the top. Those skilled in the art should understand from this illustration that a turbine stack could be constructed having several such stacks in succession, forming very tall tower embodiments of the present invention. It should be further realized that several such altitudinous stacks could be installed in very close proximity to each other, due the Bernoulli Effects that govern how wind moves around and though the present invention. Thereby, a hither to unobtainably small wind farm foot print is facilitated. Furthermore, several such turbine towers could be guyed together, as well as to the ground, forming a very structurally secure, efficient, and effective implementation of present invention.

Figure 11A:
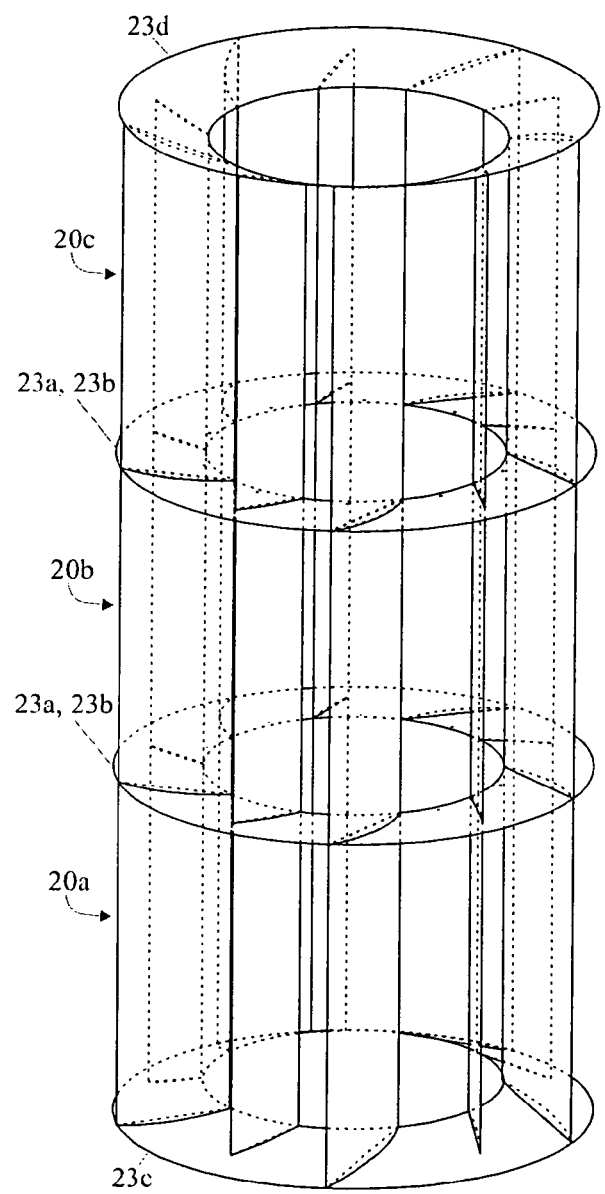
FIGS. 11a-b are three-dimensional elevation views that demonstrate a stacked implementation of the present invention; wherein, FIG. 11a discloses a potential, three-tiered, morphological stator construct having upper and lower annular conical sails, and mediating annular connection plates.
Figure 11B:
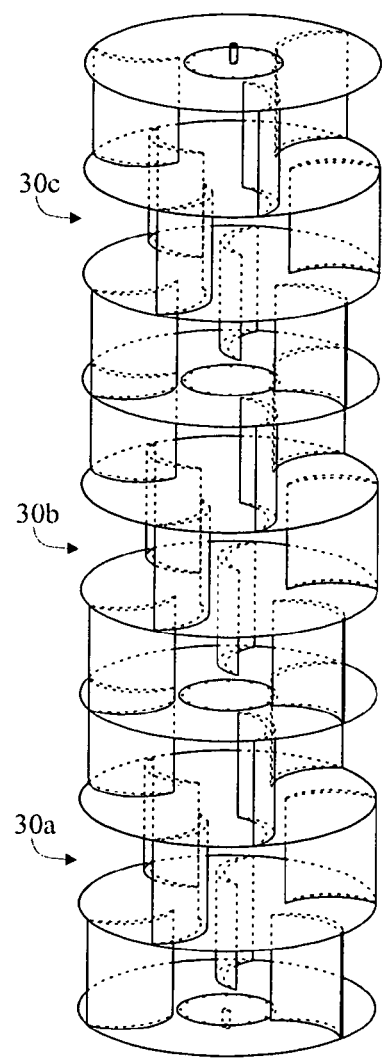

Continuing with the above reasoning, regarding the polymorphic nature of the present invention, another variform stacking arrangement is illustrated in FIG. 11a. Specifically, three different stator constructs are utilized simultaneously to form a single turbine structure. Stator section 20a of FIG. 11a resembles the stator embodiment shown in FIG. 9c, and section 20b of FIG. 11a resembles the stator embodiment shown in FIG. 9a, and section 20c of FIG. 11a resembles the stator embodiment shown in FIG. 9b. Accordingly, a stacked turbine arrangement is formed having an upper and lower conical sail, the combination of which produces an elongated version of FIG. 9d, having considerable height. FIG. 11b carries the rotor construct stacking arrangement one step farther, in that, three separate three-tiered rotors 30a, 30b, and 30c are linked, or conjoined together, forming a single rotor construct that may be utilized within the stator construct illustrated in FIG. 11a.

Figure 12A:
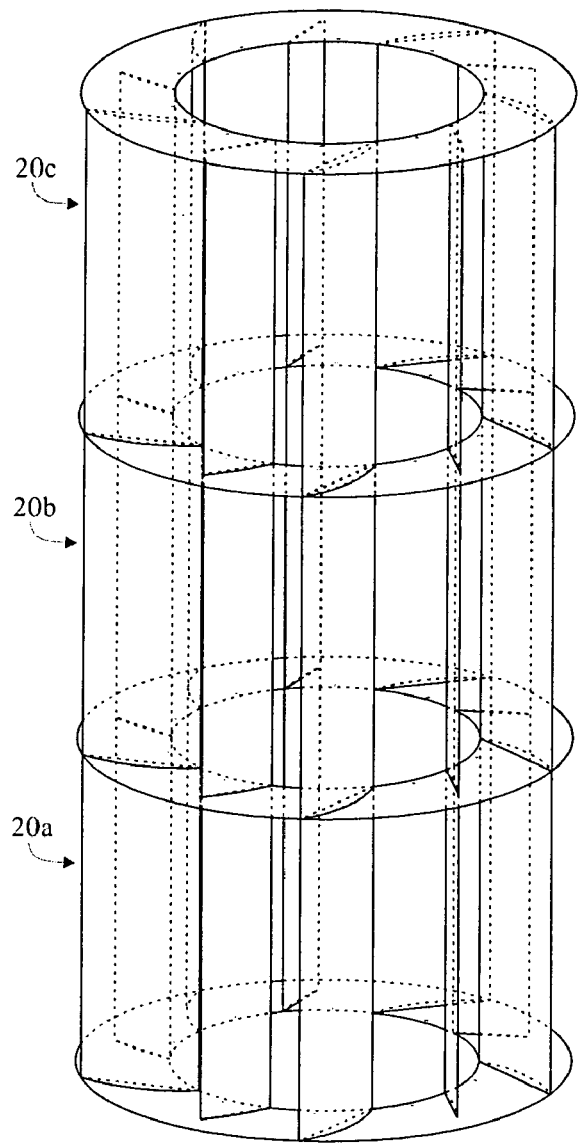
FIGS. 12a-b are three-dimensional elevation views that demonstrate a stacked implementation of the present invention; wherein, FIG. 12a discloses a potential, three-tiered, morphological stator construct that exclusively employs annular connection plates.
Figure 12B:
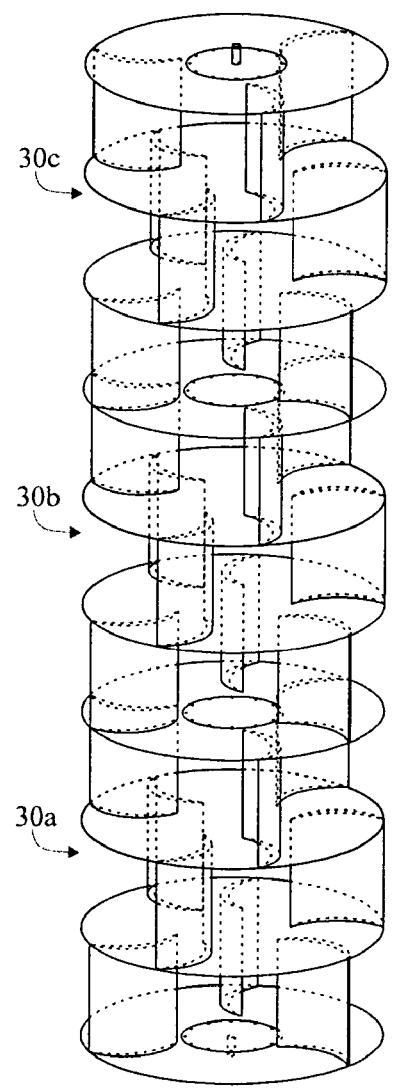

Referring now to FIG. 12a, shown is a three-tiered stator construct composed of sections 20a, 20b, and 20c, each being similar to the stator construct defined in FIG. 9a, which comprise yet another variform turbine construct of the present invention. The combined rotor construct illustrated in FIG. 12b may be employed within the stator construct of FIG. 12a, and is identical to that shown for use with FIG. 11a. This provision of the present invention yields a variety of embodiments without the need for special tooling. Various arrangements of the present invention may be assembled using independently manufactured subsections.

Figure 13A:
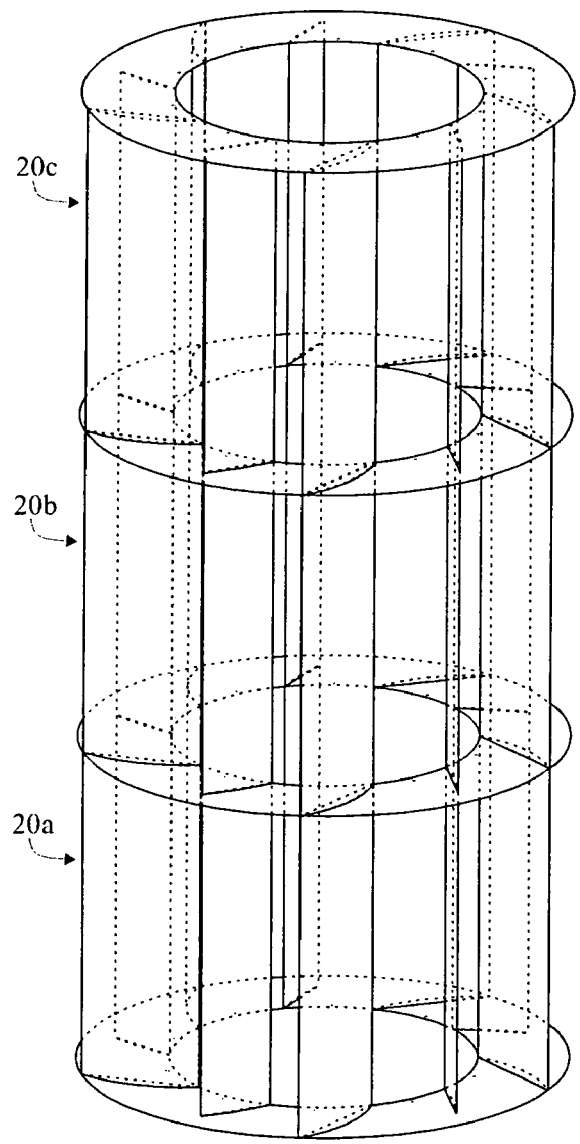
Figure 13B:
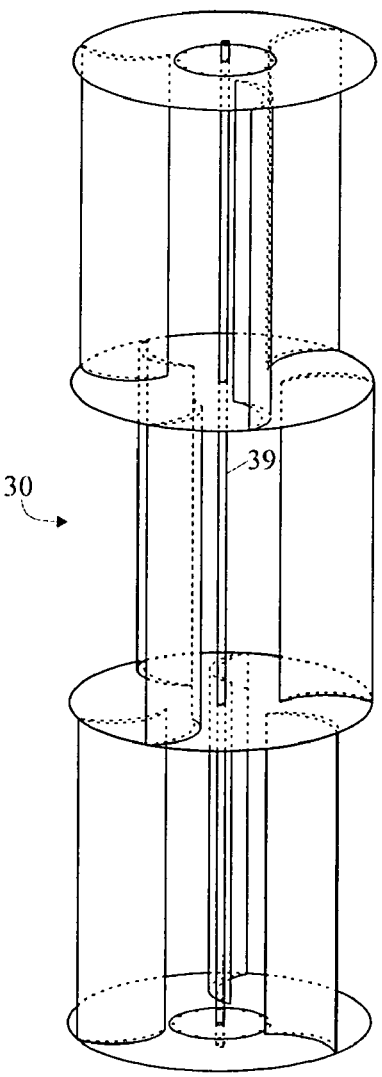

Finally, FIG. 13a illustrates the identical stator arrangement illustrated in FIG. 12a being utilized in combination with the rotor of FIG. 13b. FIG. 13b illustrates an elongated form of rotor 30 of FIG. 1, with the added exception that it demonstrates the discretionary use of a centralized vertical spindle, for added strength and stability of said rotor structure. This type of rotor construct could be utilized, but not limited to, very large turbine arrangements requiring enhanced structural integrity.

Figure 14A:
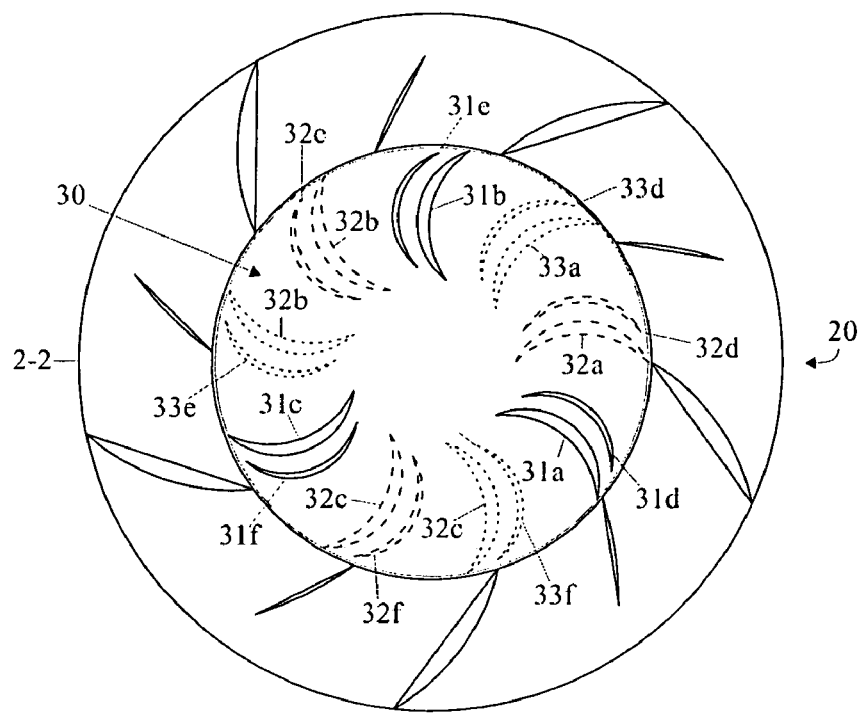
FIG. 14a is a cross-sectional view taken relative to line 2-2 of FIG. 1, exhibiting the discretionary utilization of variform aerodynamic slots, engineered to enhance the aerodynamic properties of the bidirectional rotor airfoils of the present invention.
Figures 14B, 14C:
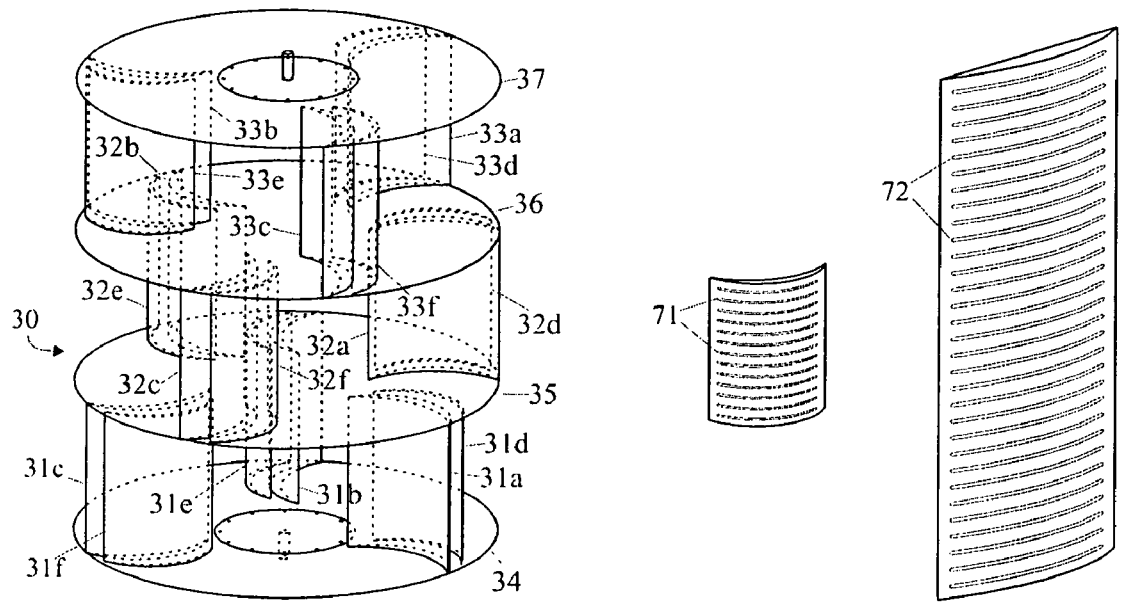
FIG. 14b is a three-dimensional elevation view of the featured, three-tiered, morphological rotor construct employed within FIG. 14a, further expounding constituent details.
FIG. 14c is a three-dimensional elevation view of a variform rotor airfoil and a variform stator blade, employing discretionary aerodynamic suction grooves, engineered to enhance the aerodynamic properties of the present invention.

An additional rotor variation of the present invention is disclosed by FIG. 14a; wherein, supplemental, secondary crescent shaped, bidirectional rotor airfoils 31 e-f, 32e-f, and 33e-f are engaged to primary airfoils 31a-c, 32a-c, and 33a-c, forming what is known in the art as aerodynamic slots. The secondary rotor airfoils 31e-f, 32e-f, and 33e-f can have smaller dimensions than the primary rotor airfoils 31a-c, 32a-c, and 33a-c. The purpose of the slots is to aid in the overall aerodynamic lift, and consequent output torque potential of the present invention, by minimizing the turbulence that ensues whenever the aspect ratio of an airfoil is less than ideal relative to anticipated prevailing and/or periodic wind speed. FIG. 14b illustrates how the rotor construct of FIG. 14a would appear three dimensionally. An additional laminar flow control mechanism that may be utilized by the present invention, for same reasons sited for aerodynamic slots, is disclosed in FIG. 14c; wherein, aerodynamic groves, or striations, are engaged to rotor airfoil 71 and stator blade 72. Both of these laminar control mechanisms are design choices of the present invention, as covered by the claims.

Figure 15A:
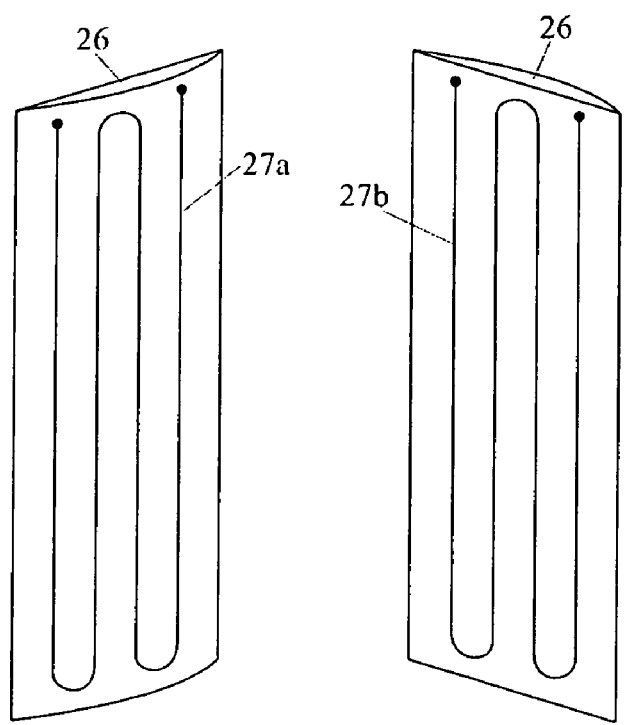
FIGS. 15a-b exemplifies the hollow voids that may be appropriately engineered within stator and/or rotor blades, according to the present invention. Thereby, facilitating the incorporation of deicing apparatus, photovoltaic cells, etc., by providing the necessary space required for energy transfer appurtenances.
Figure 15B:
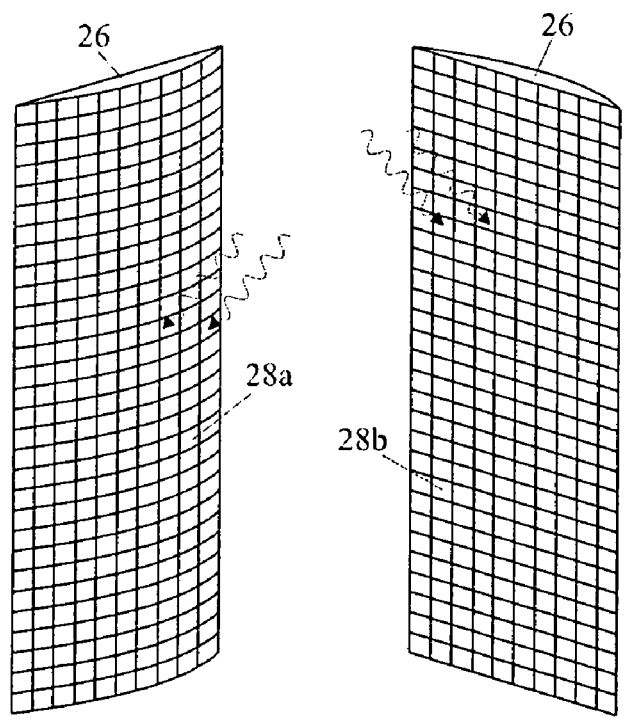

As mentioned earlier, an additional feature and advantage of the present invention is realized through the utilization of the hollow spaces engineered between the planar and convex sides of the stator blades, for advantageous purposes other than directing and focusing wind. By way of example, FIG. 15a illustrates electrical heating cables installed within a stator blade structure, so as to allow for deicing of the turbine structure in areas where such icing may be prevalent. Furthermore, FIG. 15b illustrates how the stator blades of the present invention could be fitted for utilization of malleable photovoltaic panels, that may be employed in order to supplement the wind energy output with solar energy. In such an application, appropriately engineered hollow regions could be used as raceways, facilitating electrical cellular connections as well as the necessary power cabling runs. Moreover, said hollow regions could be used as raceways, facilitating the connection of electrical instrumentation devices, as well as to provide electrical and/or mechanical raceways for conveying the harvested energy from any altitudinous subsection to an energy conversion nexus 50, or to ground level. Furthermore, it will be recognized that said hollow spaces could be used as pathways for housing bearing lubrication tubes, allowing bearing lubrication to be performed at ground level.

Figure 16A:
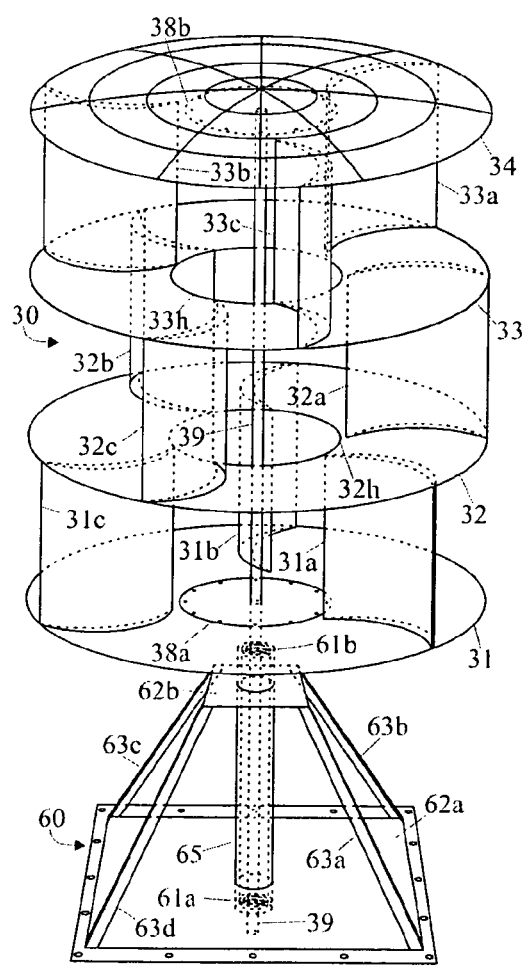
FIG. 16a is a three-dimensional elevation view exhibiting a statorless, vertical-axis, aerodynamic-hybrid wind turbine having a three-tiered morphological rotor construct with an elongated central spindle, mounted for rotation within a bearing journal, and secured for attachment or mounting atop a tower or other similarly appropriate structure, according to the present invention.
Figure 16B:
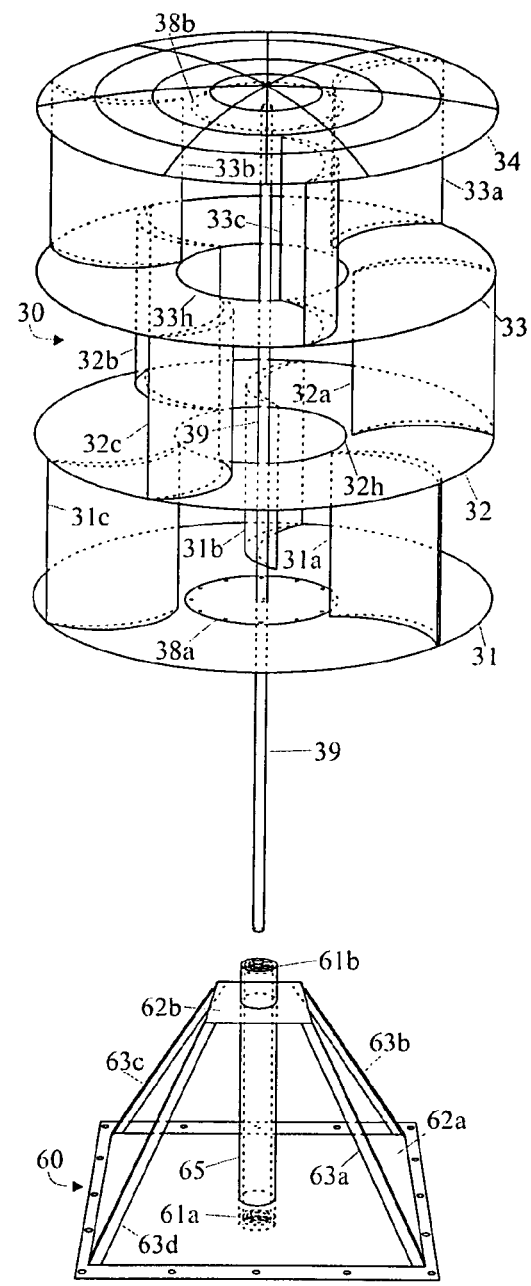
FIG. 16b is a three-dimensional elevation view of the featured, morphological construct of FIG. 16a, further expounding constituent details.

A final turbine construct of the present invention is illustrated in FIGS. 16a and 16b. FIG. 16a illustrates how a rotor construct of the present invention may be efficiently and effectively employed without an encompassing stator. The rotor being operatively similar to that of FIG. 1, with the exception that wind is not being channeled, focused, and concentrated before acting upon each of the rotor airfoils 31a-c, 32a-c, and 33a-c.

By way of example, the rotor 30 of FIG. 16a consists of three sections, or tiers, separated by circular airfoil support and partitioning plates 31, 32, 33, and 34. Partitioning plates 32 and 33 have been modified from that show in FIG. 1, in that, they are annular partitions rather than solid circular plates, in order to lighten the rotor element 30 of FIG. 16a. Each rotor tier consists three crescent shaped, bidirectional, airfoils 31a-c, 32a-c, and 33a-c, sandwiched between an upper and lower annulus or circular support plate. The rotor airfoils of each tier are positioned at 120 degree intervals, adjacent the periphery of their associated supporting plate, with their chord lines substantially perpendicular to the axis of rotation. The airfoils of subsequent tiers are incrementally skewed, with respect to the base tier, using the formula: 120 degrees divided by the number of tiers.

Moreover, a single rotor assembly may have as many as 120 tiers before a subsequent tier would have the same angular orientation as the first. Circular plates 31, 32, and 33 are each attached or secured to their respective airfoils, as they are stacked, by means of circular plate 34, allowing the entire stack to rotate as a single unit. Rotor 30 of FIG. 16a is equipped with a centralized spindle 39, that is connected to upper and lower spindle plates 38a-b. The spindle 39 being of sufficient length to extend sufficiently beyond the distal end of rotor 30 of FIG. 16a.

By way of example, rotor 30 may be supported for rotation by rotor support stand or platform 60; wherein, upper thrust bearing 61b, and lower journal bearing 61a of bearing support journal 65, accommodate the distal end of rotor spindle 39. Bearing journal 65 is supported by upper and lower journal sustaining, or securing plates 62a-b. The securing plates are diagonally supported by support members 63a-d; wherein, support platform 60 is design to be located atop a tower, or similar structure, that would allow rotor 30 to be situated within a wind stream.

FIG. 16b is a three dimensional exploded view of the vertical rotor turbine illustrated in FIG. 16a.

FIGS. 17a, 17b, and 17c are illustrations of prior art which have been included here only for the purposes of comparison and contrast.

Wind engaging the present invention will first encounter a particularized compliment of bidirectional stator blades, rising vertically between either an upper and lower annulus plate or conical sail. These blades have both a substantially planar and uniformly convex side, thereby facilitating an optimized omni-directional bias, and a virtually laminar conduction of wind both through and around the device; an appreciable advantage over prior art designs. Stator blades stationed at the proximal, or receiving side of the wind stream, are oriented and formed so as to accelerate, compress, and cyclonically focus oncoming wind, via the narrowing channels of the stator, while concurrently minimizing aerodynamic turbulence by means of the Coanada Effect. Furthermore, the unique and synergistic characteristics of the stator blades facilitate their accessorial classification as complementary aerodynamic slots. Since the kinetic energy of wind varies as a cube function of its speed, this serves to optimize both aerodynamic lift and drag forces by constraining more of the available wind to engage the rotor airfoils at consummate angles. Consequently, at slow wind speeds the composite wind energy potential is increased, and the envelope of operation extended. Conversely, at a predetermined high wind speed, sequent wind pressures will reach critical mass, and form a self-governing bow shock, thereby, protecting key energy conversion systems from overload. This fortuitously abbreviates, or eliminates, the necessity of ancillary interrupt systems and technologies, for implementations of the present invention operating in extremely harsh and/or variable wind speed environments.

Referring now to optimized northern hemisphere embodiments (optimized southern hemisphere embodiments should have a transposed helix), stator blades positioned at the left periphery, relative to oncoming wind, gently deflect portions of the wind engaging the present invention at less than ideal angles, constraining the wind to flow around rather than through the turbine. As this excess wind accelerates circumferentially around the stator, it induces an area of significant low pressure on the wind-shade side of the operative blades, resulting from the Venturi Effect. This venturi, or vacuum, not only eliminates back pressure, but adds considerably to overall torque. Moreover, significant aerodynamic lift is thereby induced upon the returning rotor airfoils, as exit winds are literally drawn out of the present invention at this critical juncture. Stator blades at the right periphery, relative to oncoming wind, have been engineered to maximize the wind harvesting potential of the present invention, without the resulting turbulence arising from the unidirectional and/or simple arcuate stator blades of prior art designs.

The aerodynamic-hybrid nature of the present invention facilitates a "best of both worlds" scenario that calls for a multi-tiered rotor construct, in order to smooth or eliminate torque pulsations that invariably arise as individual rotor airfoils wax or wane relative to their ideal attack angles. Moreover, the multi-tiered rotor construct of the present invention provides an efficient and effective means to ensure at least one rotor airfoil is positioned at an ideal attack angle, for maximum aerodynamic lift and drag potential, over the entire 360 degrees of rotation.

As the now cyclonic wind stream begins to engage the rotor, a particularized, multi-tiered compliment of individual rotor airfoils harness portions of the available wind energy, and begin oscillating between states of being highly efficient aerodynamic airfoils and optimized wind/drag sails, as they traverse their prescribed course. The substantially crescent shape of these airfoils permits them to efficiently and effectively operate bidirectionally, optimizing the transitions that occur several times per circuit. Moreover, the crescent shape of these airfoils, in concert with their boomerang-like gyrations, provides an ideal mechanism for both capturing and releasing the wind as it flows smoothly through the apparatus; exhibiting the same synchronized efficiency as two properly designed interlocking gears.

The open and unobstructed mid-section of the rotor not only permits wind to flow freely past each airfoil, producing significant aerodynamic lift, even upon airfoils stationed downstream, it facilitates the formation of a low pressure region at the heart of the turbine, thus, perfecting the stator-induced cyclone. The present invention is thereby able to employ the conservation of angular momentum to channel the majority of the wind's energy toward the periphery, where this additional leverage will impart the most torque, during those moments when individual airfoils function, primarily, as optimized wind/drag sails. Moreover, this improved topological configuration maximizes the induced aerodynamic-hybrid-torque upon the rotor, at all angles of attack, for the full 360 degrees of rotation. The use of particularized aerodynamic slots and/or suction grooves, adjunctively engaged to any rotor airfoil and/or stator blade, will further augment aerodynamic lift, while concurrently reducing consequent turbulence, and may therefore be advisable for occasional implementations of the present invention, based on parameters such as aspect ratio and/or wind speed.

As kinetic energy transfers to the rotor, the wind gradually loses speed and begins to decompress. The present invention accommodates these expanding airflows, by allowing them to diffuse outwardly through the expanding vortical channels on the distal side of the stator. Furthermore, as these slower exit winds merge with the rapidly moving, highly compressed winds traveling circumferentially around the apparatus, the subsequent energy transferal normalizes both wind streams, and a smooth, nearly laminar, equilibrium rapidly ensues. Upper and/or lower annular conical sails, should they be utilized, may augment this aspect further maximizing the available wind farm acreage.

The open-ended energy conversion, crowning, and mounting paradigms of the present invention have several advantages. The upper and/or lower rotor spindles may be suitably lengthened, so as to extend into an energy conversion nexus, or subsection, and therein be operatively connected to any number or combination of viable, adjunct, energy conversion, and/or storage systems and technologies. Moreover, the harvested energy of several, independent, stacked turbine units may be conveyed to a common energy conversion nexus, either mechanically or electrically, via appropriately engineered hollow regions formed within stator blades. Furthermore, the present invention has been designed to facilitate the conjunctive use of supplemental, renewable, and/or alternative energy systems and technologies, such as photovoltaic cells. Due to the large, vertically oriented, stationary surface area of the present invention, this feature alone comprises a decisive functional advantage over market leading horizontal-axis and vertical-axis wind turbine devices.

One very interesting, if not synergistic, consequence of the highly efficient bidirectional nature of the rotor airfoils is that they facilitate an embodiment, of the present invention, having a naked rotor. Omitting the stator will result in some lost efficiency and safety, but will substantially reduce the cost of construction, and will facilitate the production of a reduced cost alternative for small "backyard" turbine markets. Furthermore, unlike unidirectional Darrieus-like rotor airfoils, the bidirectional characteristics of rotor airfoils of the present invention, are self-starting, virtually silent, and remarkably efficient even while operating independent of a stator. Combine these unique attributes with an equally innovative stator, and the result is an unprecedented scientific advancement in wind energy conversion technology utilizing a vertical-axis wind turbine apparatus.

A Preferred Section is a line segment divided into two parts. Point C is positioned such that the ratio of the short half to the long half is equal to the ratio of the long half to the whole segment. Symbolically it can be represented as follows:

$$A\text{———}C\text{———}B \quad \text{where } CB/AB = AC/AB, \text{ or } AB^2 = BC \cdot AC$$

Moreover, the Preferred Ratio equals 1:(1+the square root of 5)/2 (1:0.61830339887 . . . ), and is commonly referred to as the Greek lower-case letter phi (Ø). Additional unique mathematical relationships exist, in that, $Ø^2=Ø+1$ and $1/Ø=Ø-1$. Thus, using approximate numerical values, $1/Ø=0.618$, $Ø=1.618$, and $Ø^2=2.618$.

It should follow, therefore, that those skilled in the art may employ the principles heretofore discussed, in order to produce specialized embodiments, adaptable and suited to implementation and/or installation constraints, without departing from the spirit and/or scope of the present invention. The choice of materials, methods used in construction, energy conversion, crowning, and mounting paradigms, surface and/or subsurface coatings or treatments, structural reinforcements or reductions (such as the use of a centralized vertical spindle and/or the utilization of annulus airfoil-tier partitions instead of plates), appropriate maintenance provisions, the use of ancillary systems and technologies (such as deicing or weather monitoring devices), automation and control techniques, etc., should appropriately vary by location and/or environment.

Those skilled in the art will especially appreciate the implementation diversity, and adaptability of the present invention. Structural proportions, specific angles, curvatures, lengths, heights, widths, and the quantity, or use of any discretionary component, etc., may be appropriately engineered to vary by location and/or environment, without departing from the spirit and/or scope of the present invention. This is further realized by providing a unique apparatus that is not merely scalable, but polymorphic. The nature of the present invention will be appreciated as a detailed description of the preferred embodiments continues, and its distinguishing characteristics are further expatiated.

It is further desirable to provide an efficient and effective means to adjust the average static wind pressure and velocity, at the rotor, by means of appropriately engineered adjustments to the stator/rotor structural proportion ratios. Increasing the total stator area with respect to the rotor may help protect integral energy conversion systems, such as electric generators, from powerful wind gusts known to occur regularly at particular installation sites. As wind pressure reaches critical mass, a self-limiting, protective bow shock will form on the upstream side of the device, constraining excess wind to flow around the turbine rather than through it (larger stator proportions will increase the maximum compression level of the oncoming wind up to about Betz Law). Additionally, an increased stator proportion may allow a wind turbine, of the present design, to operate successfully in prevailing low wind speed regions, or at extreme altitudes, by focusing and concentrating tenuous airflows. Contrastingly, increasing the total area of the rotor with respect to the stator may be beneficial in areas of constant, midrange, wind speeds.

It is further desirable to provide an efficient and effective means to adjust the wind energy harvesting potential of the rotor airfoils of the present invention by accommodating appropriately engineered adjustments to their individual length, camber (curvature), and/or aspect ratio (height/width). This would become especially important following any adjustments to the stator/rotor structural proportion.

It is further desirable to provide an efficient and effective means to adjust the angle of attack of any rotor airfoil of the present invention by deviating from the preferred orientation, of either end point, substantially between a plus or minus one to twenty-three degrees.

It is further desirable to provide an efficient and effective means to adjust the angle of attack of any primary stator blade of the present invention by deviating from the preferred angle substantially between a plus or minus one to twenty-three degrees.

It is further desirable to provide an efficient and effective means to adjust the wind energy harvesting potential of any primary stator blade of the present invention by accommodating appropriately engineered adjustments to their individual length, camber (curvature), and/or aspect ratio (height/width). This would become especially important following any adjustments to the stator/rotor structural proportion.

It is further desirable to provide an efficient and effective means to adjust the angle of attack of any secondary stator blade of the present invention by deviating from the preferred angle substantially between a plus or minus one to twenty-three degrees.

It is further desirable to provide an efficient and effective means to adjust the wind energy harvesting potential of any secondary stator blade of the present invention by accommodating appropriately engineered adjustments to their individual length, camber (curvature), and/or aspect ratio (height/width). This would become especially important following any adjustments to the stator/rotor structural proportion.

It is further desirable to yield a variety of embodiments of the present invention, adaptable and suited to implementation and/or installation site requirements, in order to maximize the wind energy harvesting potential of the present invention, for any given wind regime, by means of an appropriately engineered adjustment to the total number of primary and/or secondary stator blades, resulting in a device having substantially between five to twenty-one blades of either type. This would become especially important following any adjustments to the stator/rotor structural proportion. Embodiments of the present invention having a total odd-numbered compliment of stator blades should ideally employ only primary type blades. Conversely, embodiments of the present invention having a total even-numbered compliment of stator blades may appropriately utilize alternating primary and secondary type blades.

It is further desirable to provide an efficient and effective means to adjust the wind energy harvesting potential, of the present invention, by accommodating appropriately engineered laminar flow control mechanisms, such as aerodynamic slots and/or suction grooves, thereby, augmenting the aerodynamic lift potential of the apparatus, while concurrently minimizing any ensuing turbulence.

It is further desirable to provide an efficient and effective means to enhance overall structural integrity, by means of an appropriately sized central spindle, based primarily, but not exclusively, on installation site and/or implementation parameters.

It is further desirable to provide an efficient and effective means of reconciling manufacturing costs vs. potential benefits, by having the discretionary option to omit the upper and/or lower, annular conical sail, based primarily, but not exclusively, on installation site and/or implementation parameters.

It is further desirable to provide an efficient and effective means to adjust the compression/decompression rate of the wind entering and exiting the present invention, by means of appropriately engineered adjustments to the slope angles, of either the upper and/or lower, annular conical sail, by deviating from the preferred angle substantially between a plus or minus one to twenty-three degrees.

It is further desirable to provide an efficient and effective means to minimize the number of energy conversion subsections, required in a stacked multi-segmented tower implementation, by appropriately engineered usage of hollow regions formed within stator blades. Transferring the harvested energy of several independent turbine units to a common energy conversion nexus, either mechanically or electrically, via appropriately designed stator blades, will lower construction costs, and drastically reduce the maintenance issues associated with this implementation concept. Although it would be possible to mechanically couple all of the turbine subsections, incorporated within a multi-segmented tower, providing a cost-effective means for allowing them to operate independently, facilitates an efficient and effective means to harvest the variable wind energy potentials encountered at increasing altitudes.

It is further desirable to yield a variety of embodiments of the present invention, adaptable and suited to implementation and/or installation site requirements, in order to maximize the wind energy harvesting potential of the present invention, for any given wind regime, by means of an appropriately engineered adjustment to the total number of rotor airfoil tiers—each rotor having a minimal compliment of at least two tiers.

It is further desirable to yield a variety of embodiments of the present invention, adaptable and suited to implementation and/or installation site requirements, in order to accommodate a discretionary rotor variation when stacked; wherein, the typical multi-tiered rotor construct is apportioned across an equivalent number of stacked stator sections. The primary consequence would be a substantial reduction in fabrication and/or installation expenses.

It is further desirable to yield a variety of embodiments, of the present invention, adaptable and suited to implementation and/or installation site requirements, in order to facilitate the stabilization of any implementation, by means of guy cables, or other such systems and technologies, as may be deemed appropriate by those skilled in the art.

It is further desirable to yield a variety of embodiments of the present invention, adaptable and suited to implementation and/or installation site requirements, in order to facilitate the conversion, transmission, and/or storage of the energy harvested by the present invention, through the adjunct use of any number or combination of viable energy conversion and/or storage systems and technologies, including, but not limited to, emergent hydrogen generation systems and technologies, or the transitionally-coupled generators described in U.S. Pat. No. 6,020,725 to Roberts, which is herein incorporated by reference.

It is further desirable to provide an efficient and effective means to facilitate the conversion, transmission and/or storage of the energy harvested by the present invention, by having all energy conversion subsections, incorporated within altitudinous mid-regions of a stacked multi-segmented tower implementation, designed having a diameter equivalent to their adjacent turbine sections, in order to minimize turbulence. However, the height of any such subsection may vary, by requisite proportion, in order to accommodate the particularized energy conversion and/or storage systems and technologies utilized within, taking into consideration any and all applicable maintenance prerequisites, and acoustic shielding/dampening provisions.

It is further desirable to yield a variety of embodiments of the present invention, adaptable and suited to implementation and/or installation site requirements, so as to accommodate an open-ended mounting paradigm. Moreover, it should not be requisite for the present invention to require a particularized base, thereby, accommodating virtually any viable mounting scheme. Moreover, base or mounting structures shall have no particularized shape or proportion requirements other than constituent coupling provisions, which may appropriately vary for each implementation of the present invention.

It is further desirable to yield a variety of embodiments of the present invention, adaptable and suited to implementation and/or installation site requirements, so as to accommodate the utilization of any viable type or combination of fabrication materials and/or construction methodologies, based primarily, but not exclusively, on installation site and/or implementation parameters.

It is further desirable to yield a variety of embodiments of the present invention, adaptable and suited to implementation and/or installation site requirements, so as to facilitate the incorporation of any suitable adjunct system or technology, such as a flywheel, in order to maximize the comprehensive energy conversion capabilities of the present invention, particularly, in areas of prominent or variable wind speeds, while guarding against any incidental impairment. Moreover, one or more of the airfoil-tier partition plates, could be double walled, or otherwise increased in thickness or type of material, in order to eliminate the need for a separate flywheel, while concurrently increasing overall structural integrity. Furthermore, the outer edges of any partition plate could be beveled at consummate angles to facilitate an increase in the overall aerodynamic properties of the present invention.

It is further desirable to yield a variety of embodiments of the present invention, adaptable and suited to implementation and/or installation site requirements, so as to facilitate significantly lightening the rotor, effectually maximizing the wind energy conversion potential for instances of the present invention operating in low wind speed regimes, or at extremely high attitudes, by optionally removing an appropriate, central most portion, of any mediating, airfoil-tier partition plate. Simply stated, annulus partitions may suitably substitute for plate partitions.

It is further desirable to yield a variety of embodiments of the present invention, adaptable and suited to implementation and/or installation site requirements, so as to electively facilitate the conjunctive use of supplemental, renewable, and/or alternative, energy systems and technologies, such as photovoltaic cells. These could be strategically installed on any sufficiently exposed surface, and used to augment the total energy production capabilities of the present invention. All such supplemental energy could be conveyed to a common energy conversion nexus, via particularized hollow regions within stator blades.

It is further desirable to yield a variety of embodiments of the present invention, adaptable and suited to implementation and/or installation site requirements, in order to facilitate the incorporation of supplemental deicing systems and technologies. Some of which could be embedded within the materials used in fabrication, or within particularized hollow regions of stator/rotor blades, and energized or subsidized by the energy harvested by the present invention. Thus, energy may either be transferred away from or toward any individual subsection of the present invention.

It is further desirable to yield a variety of embodiments that may satisfy a comprehensive gamut of energy production specifications, encompassing, but not limited to, single sub-kilowatt models all the way to multi-megawatt segmented towers forming large commercial/utility grade wind farm implementations.

It is further desirable to yield a variety of embodiments that may correct for the antipodal Coriolis Forces, known to exist between the northern and southern hemispheres, by providing a means for the elective reversal of the angles and orientations of both the stator and rotor blades of the present invention. An optimized design implementation will have a right helix for installations in the northern hemisphere, and a left helix for installations in the southern hemisphere.

It is further desirable to yield a variety of embodiments of the present invention, adaptable and suited to implementation and/or installation site requirements, so as to accommodate crowning the present invention with a particularized structure, such as a dome, designed to repel atmospheric precipitation, minimize turbulence, and protect any mechanical or instrumental members employed at the summit, such as bearings and/or ancillary weather monitoring devices.

It is further desirable to yield a variety of embodiments of the present invention, adaptable and suited to implementation and/or installation site requirements, so as to provide ameliorated domain insensitivity. Thereby, facilitating installations of the present invention in areas where prior art turbines either cannot operate, or cannot be installed, due to inherent structural design limitations or safety concerns, such as within or atop tall building structures.

It is further desirable to yield a variety of embodiments of the present invention, adaptable and suited to implementation and/or installation site requirements, so as to accommodate an implementation of the present invention having a naked rotor. Omitting the stator will result in some lost efficiency and safety, but will substantially reduce the cost of construction, and will facilitate the production of a reduced cost alternative for small "backyard" turbine markets.

It is further desirable to provide an efficient and effective means of facilitating the discretionary utilization of an artificially intelligent DACS (Data Acquisition, Automation, and Control System), by housing it within any energy conversion nexus of the present invention, thereby, providing an efficient and effective means of reducing the need for occasional human intercession, while providing the operator with an extended range of automatic, operational, and reporting options. Moreover, for implementations of the present invention utilizing a plurality of energy conversion systems and technologies, a DACS would facilitate the ability to autonomously engage and/or disengage these devices, mechanically or electrically, in an optimal pattern, in order to spontaneously minimize the connected inertial load, and maximize the comprehensive energy output potential of the apparatus.

It is further desirable to yield a variety of embodiments that may achieve the aforementioned objectives with a minimal compliment of moving parts, environmental concerns, maintenance requirements and/or impediments, as well as reduced operational, manufacturing, and installation expenses.

It would also be advantageous to be able to stack vertical-axis wind turbines, thereby forming multi-segmented towers capable of harvesting wind energies at incremental altitudes, while maximizing wind farm acreage. However, this important implementation alternative has not been fully exploited in the past. Furthermore, the upper and lower conical sails may contribute appreciably to overall system performance; however, the benefits vs. manufacturing expenses become less defensible if units are stacked, and should therefore be deemed discretionary.

In conclusion, the present invention relates in general to a vertical-axis wind turbine having wind energy extraction capabilities that border the currently understood theoretical limits, over an extended range of wind velocities and/or altitudes. The present invention presents a new and improved, stackable, aerodynamic-hybrid wind turbine apparatus substantially exhibiting the following characteristics: (1) Resolves the disadvantages of prior art; (2) An optimized omni-directional bias, aerodynamic-hybrid-torque potential, enhanced back pressure relief, decreased turbulence, ameliorated laminar flow, and augmented cyclonic wind currents; (3) Stator blade configurations have both a planar and convex side, resolves turbulence issues associated with prior art, facilitates stackable embodiments, yields ameliorated implementation flexibility, and may be categorized as either primary or secondary; (4) The harvested energy of several, independent, stacked turbine units may be conveyed to a common energy conversion nexus, either mechanically or electrically; (5) Rotor blade configurations are multi-tiered, crescent shaped, bidirectional airfoils that provide greater moments of torque while operating as aerodynamic-lift-airfoils than as wind-drag-sails, yields ameliorated implementation flexibility, and may efficiently and effectively operate independent of a stator; (6) The present invention further provides a dynamic implementation system rather than a merely scalable static construct; (7) Energy conversion, crowning, and mounting paradigms are open-ended, annulus airfoil-tier partitions may suitably substitute for plates, and provisions have been made for the utilization of renewable and/or alternative energy systems and technologies, as well as for the incorporation of discretionary ancillary systems and technologies such as deicing apparatus, annular conical sails, centralized vertical spindles, aerodynamic slots, and suction grooves.

While the present invention has been described here with reference to specific embodiments, variform embodiments of the invention will become apparent to persons skilled in the art, upon reference to the above disclosure. It is therefore contemplated that the following claims will cover any and all deviations or derivatives that fall within the spirit and/or scope of the invention.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. A vertical wind turbine device, comprising:
   a) a rotor, rotatable about a vertical axis in an annular stator;
   b) a plurality of vertically elongated rotor airfoils, disposed circumferentially around the vertical axis;
   c) the rotor airfoils each having a horizontal cross-section with a crescent shape including a convex leading side and a concave trailing side with a thicker middle section that tapers to narrower sections at ends
   d) a plurality of vertically elongated stator blades, disposed circumferentially around the vertical axis;
   e) the stator blades each having a horizontal cross-section with a planar side and a convex side; and
   f) the convex side of the stator blades and the convex leading side of the rotor airfoils being oriented to face circumferentially around the vertical axis in a common direction.

2. A device in accordance with claim 1, wherein the crescent shape of the rotor airfoils are symmetrical about a vertical bisection, the vertical bisection being oriented orthogonal to a longitudinal direction of the horizontal cross-section.

3. A device in accordance with claim 1, wherein an open center is defined between the rotor airfoils which are spaced apart radially from the vertical axis without any structure between the rotor airfoils and the vertical axis; and wherein a diameter of the open center is approximately 38% of a diameter of the rotor.

4. A device in accordance with claim 1, wherein the convex side of the stator blades are symmetrical about a vertical bisection, the vertical bisection being oriented orthogonal to a longitudinal direction of a horizontal cross-section of the stator blade.

5. A device in accordance with claim 1, wherein the rotor airfoils are larger in proportion to the stator blades.

6. A device in accordance with claim 1, wherein the stator blades are primary stator blades having common dimensions; and further comprising:
   a plurality of vertically elongated secondary stator blades, disposed circumferentially around the vertical axis; and
   the secondary stator blades having smaller dimensions than the primary stator blades.

7. A device in accordance with claim 1, wherein the stator blades include a plurality of elongated, horizontally oriented grooves formed in the convex side.

8. A device in accordance with claim 1, wherein the stator blades are hollow and include means for deicing the stator blades or means for conveying energy through the stator blades.

9. A device in accordance with claim 1, wherein the planar side of the stator blades are oriented at an angle with respect to a plane passing through the vertical axis and a tip of the stator blade between 103 to 149 degrees.

10. A device in accordance with claim 1, wherein the rotor airfoils are oriented at an angle with respect to the vertical axis between 0 to 23 degrees in either direction.

11. A device in accordance with claim 1, wherein the rotor airfoils are primary rotor airfoils having common dimensions; and further comprising:
a plurality of vertically elongated secondary rotor airfoils, disposed circumferentially around the vertical axis; each secondary rotor airfoils disposed adjacent to and spaced-apart from the leading side of a corresponding primary rotor airfoils; and
the secondary rotor airfoils having smaller dimensions than the primary rotor airfoils.

12. A device in accordance with claim 1, wherein the rotor airfoils include a plurality of elongated, horizontally oriented grooves formed in the convex leading side.

13. A device in accordance with claim 1, wherein the rotor is divided into at least two rotor subsections coupled to at least one energy conversion nexus disposed at an elevated location between the at least two rotor subsections.

14. A device in accordance with claim 1, wherein the rotor includes a plurality of rotor modules stacked and coupled together to form a desired height.

15. A device in accordance with claim 1, wherein the rotor airfoils include a plurality of sequential, horizontal tiers; the rotor airfoils of each tier having a different angular orientation with respect to an adjacent tier.

16. A vertical wind turbine device, comprising:
a) a rotor, rotatable about a vertical axis in an annular stator;
b) a plurality of vertically elongated rotor airfoils, disposed circumferentially around the vertical axis;
c) an open center defined between the rotor airfoils which are spaced apart radially from the vertical axis without any structure between the rotor airfoils and the vertical axis, a diameter of the open center being approximately 38% of a diameter of the rotor;
d) a plurality of vertically elongated stator blades, disposed circumferentially around the vertical axis; and
e) the stator blades each having a horizontal cross-section with a planar side and a convex side; and
f) the convex side of the stator blades and a convex leading side of the rotor airfoils being oriented to face circumferentially around the vertical axis in a common direction.

17. A device in accordance with claim 16, wherein the rotor airfoils each have a horizontal cross-section with a crescent shape including a convex leading side and a concave trailing side with a thicker middle section that tapers to narrower sections at ends.

18. A device in accordance with claim 17, wherein the crescent shape of the rotor airfoils are symmetrical about a vertical bisection, the vertical bisection being oriented orthogonal to a longitudinal direction of the horizontal cross-section.

19. A device in accordance with claim 16, wherein the convex side of the stator blades is symmetrical about a vertical bisection.

20. A vertical wind turbine device, comprising:
a) a rotor, rotatable about a vertical axis in an annular stator;
b) a plurality of vertically elongated rotor airfoils, disposed circumferentially around the vertical axis;
c) a plurality of vertically elongated stator blades, disposed circumferentially around the vertical axis; and
d) the stator blades each having a horizontal cross-section with a planar side and a convex side;
e) the convex side of the stator blades and a convex leading side of the rotor airfoils being oriented to face circumferentially around the vertical axis in a common direction; and
f) the convex side of the stator blades being symmetrical about a vertical bisection, the vertical bisection being oriented orthogonal to a longitudinal direction of a horizontal cross-section of the stator blade.

21. A device in accordance with claim 20, wherein: the rotor airfoils each have a horizontal cross-section with a crescent shape including a convex leading side and a concave trailing side with a thicker middle section that tapers to narrower sections at ends.

22. A device in accordance with claim 21, wherein the crescent shape of the rotor airfoils is symmetrical about a vertical bisection, the vertical bisection being oriented orthogonal to a longitudinal direction of the horizontal cross-section.

23. A device in accordance with claim 20, wherein an open center is defined between the rotor airfoils which are spaced apart radially from the vertical axis without any structure between the rotor airfoils and the vertical axis; and wherein a diameter of the open center is approximately 38% of a diameter of the rotor.

24. A device in accordance with claim 20, wherein the stator blades are primary stator blades having common dimensions; and further comprising:
a plurality of vertically elongated secondary stator blades, disposed circumferentially around the vertical axis; and
the secondary stator blades having smaller dimensions than the primary stator blades.

25. A device in accordance with claim 20, wherein the stator blades include a plurality of elongated, horizontally oriented grooves formed in the convex side.

26. A device in accordance with claim 20, wherein the stator blades are hollow and include means for deicing the stator blades.

27. A device in accordance with claim 20, wherein the planar side of the stator blades are oriented at an angle with respect to a plane passing through the vertical axis and a tip of the stator blade between 103 to 149 degrees.

28. A device in accordance with claim 20, wherein the rotor airfoils are primary rotor airfoils having common dimensions; and further comprising:
a plurality of vertically elongated secondary rotor airfoils, disposed circumferentially around the vertical axis; each secondary rotor airfoils disposed adjacent to and spaced-apart from the leading side of a corresponding primary rotor airfoils; and
the secondary rotor airfoils having smaller dimensions than the primary rotor airfoils.

29. A device in accordance with claim 20, wherein the rotor airfoils include a plurality of elongated, horizontally oriented grooves formed in the convex leading side.

30. A device in accordance with claim 20, wherein the rotor is divided into at least two rotor subsections coupled to at least one energy conversion nexus disposed at an elevated location between the at least two rotor subsections.

31. A device in accordance with claim 20, wherein the rotor includes a plurality of rotor modules stacked and coupled together to form a desired height.

32. A device in accordance with claim 20, wherein the rotor airfoils include a plurality of sequential, horizontal tiers; the rotor airfoils of each tier having a different angular orientation with respect to an adjacent tier.

33. A vertical wind turbine device, comprising:
   a) a rotor, rotatable about a vertical axis in an annular stator;
   b) a plurality of vertically elongated rotor airfoils, disposed circumferentially around the vertical axis;
   c) the rotor being divided into at least two rotor subsections coupled to at least one energy conversion nexus disposed at an elevated location between the at least two rotor subsections;
   d) a plurality of vertically elongated stator blades, disposed circumferentially around the vertical axis; and
   e) the stator blades each having a horizontal cross-section with a planar side and a convex side; and
   f) the convex side of the stator blades and a convex leading side of the rotor airfoils being oriented to face circumferentially around the vertical axis in a common direction.

34. A device in accordance with claim 33, wherein at least two rotor subsections includes a plurality of rotor subsections stacked and coupled together to form a desired height.

35. A device in accordance with claim 33, wherein the rotor airfoils each have a horizontal cross-section with a crescent shape including a convex leading side and a concave trailing side with a thicker middle section that tapers to narrower sections at ends.

36. A device in accordance with claim 35, wherein the crescent shape of the rotor airfoils is symmetrical about a vertical bisection, the vertical bisection being oriented orthogonal to a longitudinal direction of the horizontal cross-section.

37. A device in accordance with claim 33, wherein an open center is defined between the rotor airfoils which are spaced apart radially from the vertical axis without any structure between the rotor airfoils and the vertical axis; and wherein a diameter of the open center is approximately 38% of a diameter of the rotor.

38. A device in accordance with claim 33, wherein the convex side of the stator blades is symmetrical about a vertical bisection, the vertical bisection being oriented orthogonal to a longitudinal direction of a horizontal cross-section of the stator blade.

* * * * *